(12) United States Patent
Heller

(10) Patent No.: US 10,024,142 B2
(45) Date of Patent: *Jul. 17, 2018

(54) SELECTIVE EXTRACTION OF FLUIDS FROM SUBSURFACE WELLS

(71) Applicant: BESST, Inc., San Rafael, CA (US)

(72) Inventor: Noah R. Heller, Corte Madera, CA (US)

(73) Assignee: BESST, INC., San Rafael, CA (US)

( * ) Notice: Subject to any disclaimer, the term of this patent is extended or adjusted under 35 U.S.C. 154(b) by 316 days.

This patent is subject to a terminal disclaimer.

(21) Appl. No.: 15/040,241

(22) Filed: Feb. 10, 2016

(65) Prior Publication Data

US 2016/0160478 A1    Jun. 9, 2016

Related U.S. Application Data

(63) Continuation of application No. 13/917,057, filed on Jun. 13, 2013, now Pat. No. 9,284,722.

(60) Provisional application No. 61/659,740, filed on Jun. 14, 2012.

(51) Int. Cl.
| | |
|---|---|
| *E21B 43/00* | (2006.01) |
| *E21B 47/00* | (2012.01) |
| *E03B 3/08* | (2006.01) |
| *B09C 1/00* | (2006.01) |
| *C02F 103/06* | (2006.01) |

(52) U.S. Cl.
CPC ............... *E21B 43/00* (2013.01); *B09C 1/00* (2013.01); *E03B 3/08* (2013.01); *E21B 47/00* (2013.01); *B09C 2101/00* (2013.01); *C02F 2103/06* (2013.01); *C02F 2209/001* (2013.01)

(58) Field of Classification Search
CPC ...... E21B 43/12; E21B 43/14; E21B 47/0007; E21B 47/10; E21B 49/00; E21B 49/08; E03B 3/08; E03B 3/12; E03B 3/14
See application file for complete search history.

(56) References Cited

U.S. PATENT DOCUMENTS

| | | | |
|---|---|---|---|
| 2,605,637 | A | 8/1952 | Rhoades |
| 5,432,709 | A | 7/1995 | Vollweiler |
| 5,553,492 | A | 9/1996 | Barrett et al. |
| 6,021,664 | A | 2/2000 | Granato et al. |
| 6,131,451 | A | 10/2000 | Izbicki et al. |
| 6,164,127 | A | 12/2000 | Izbicki et al. |
| 6,542,827 | B1 | 4/2003 | Koster |
| 7,247,278 | B2 | 7/2007 | Burge et al. |

(Continued)

*Primary Examiner* — Robert E Fuller
(74) *Attorney, Agent, or Firm* — Roeder & Broder LLP; James P. Broder

(57) ABSTRACT

A method for reducing the extent of treatment required for groundwater includes the step of determining one of groundwater flow and groundwater chemistry within at least one of a plurality of fluid zones within a subsurface well having a primary pump positioned at least partially therein. The method also includes modifying fluid dynamics within the subsurface well based on at least one of the groundwater flow and chemistry. The method further includes selectively extracting groundwater from at least one of the plurality of fluid zones with the primary pump. The method also includes removing one or more contaminants from the groundwater with a fluid treatment system. Additionally, the step of determining can include the use of miniaturized technologies, such as miniaturized flow profiling technologies, miniaturized water sampling technologies and miniaturized sensors.

26 Claims, 10 Drawing Sheets

(56) References Cited

U.S. PATENT DOCUMENTS

| | | |
|---|---|---|
| 8,353,341 B1 | 1/2013 | Petrey, III |
| 2002/0166663 A1 | 11/2002 | Last et al. |
| 2012/0103627 A1 | 5/2012 | Larssen et al. |

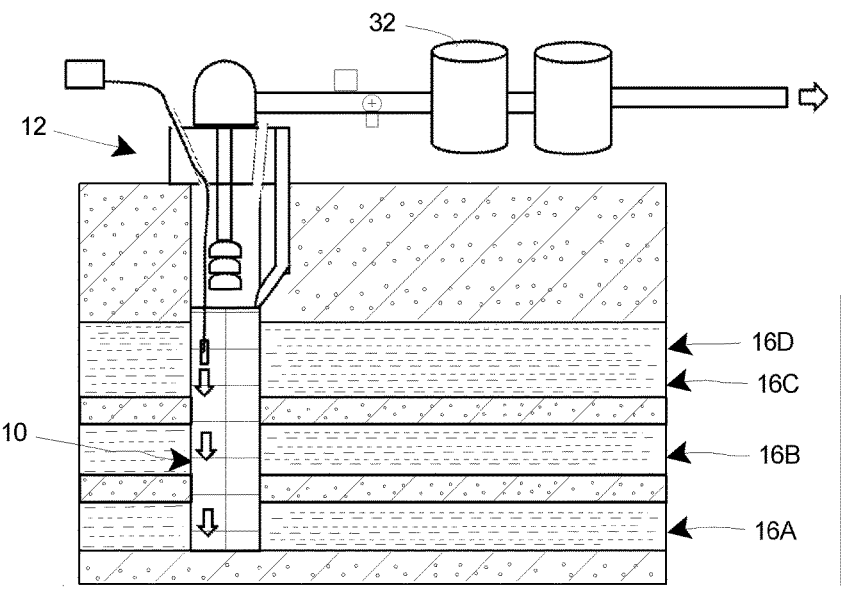 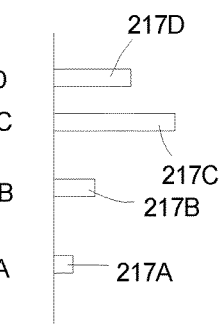
Fig. 2-1    Fig. 2-2
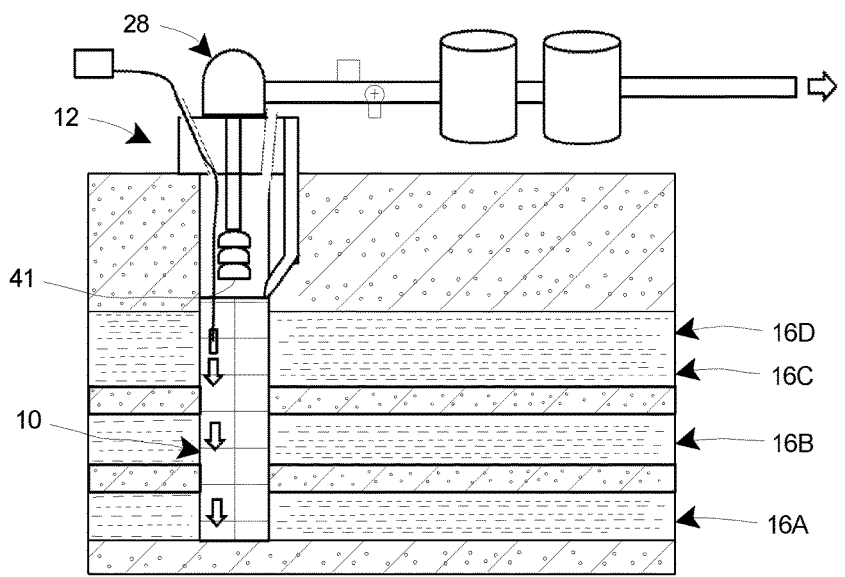 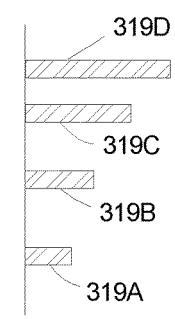
Fig. 3A-1    Fig. 3A-2

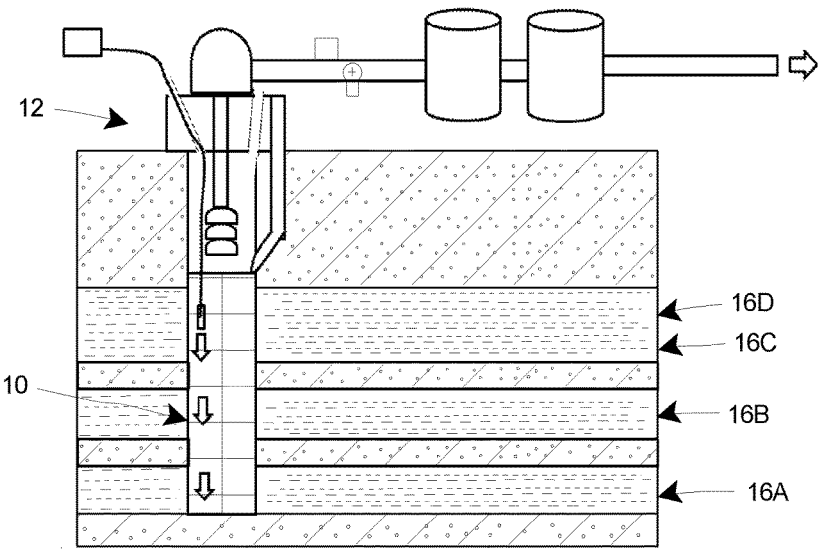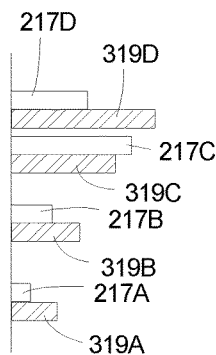
Fig. 4-1    Fig. 4-2
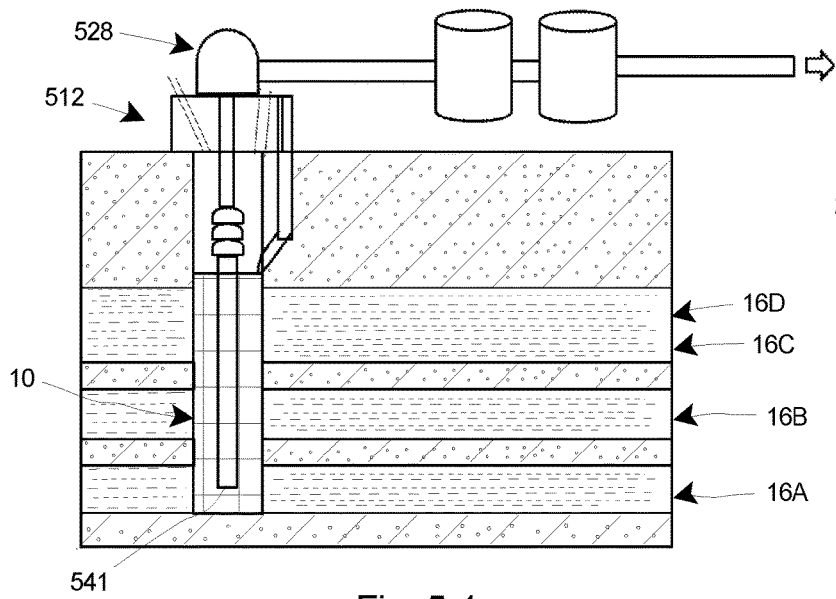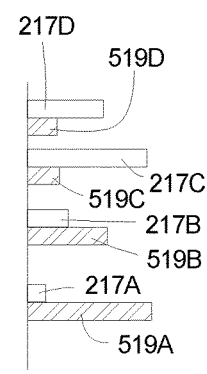
Fig. 5-1    Fig. 5-2

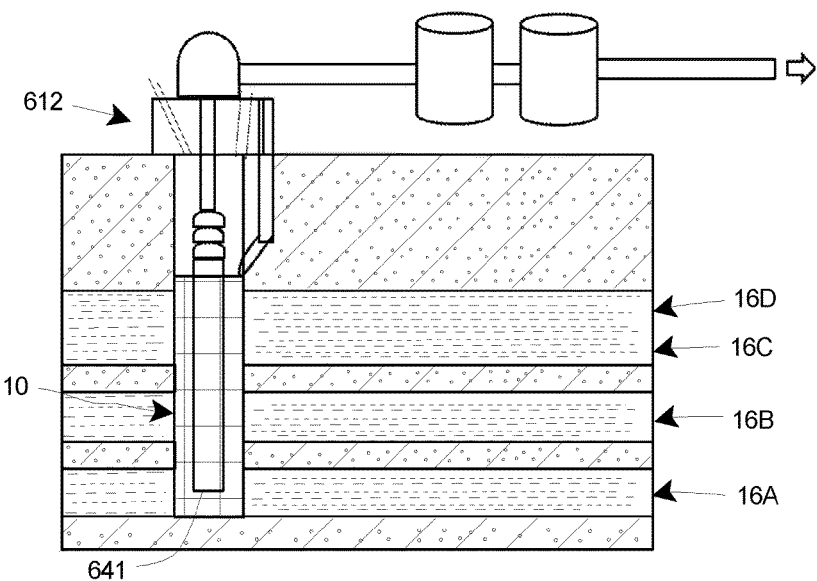
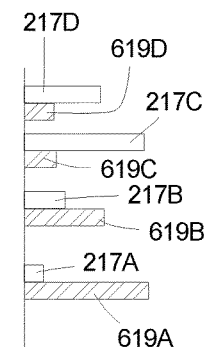
Fig. 6-1    Fig. 6-2
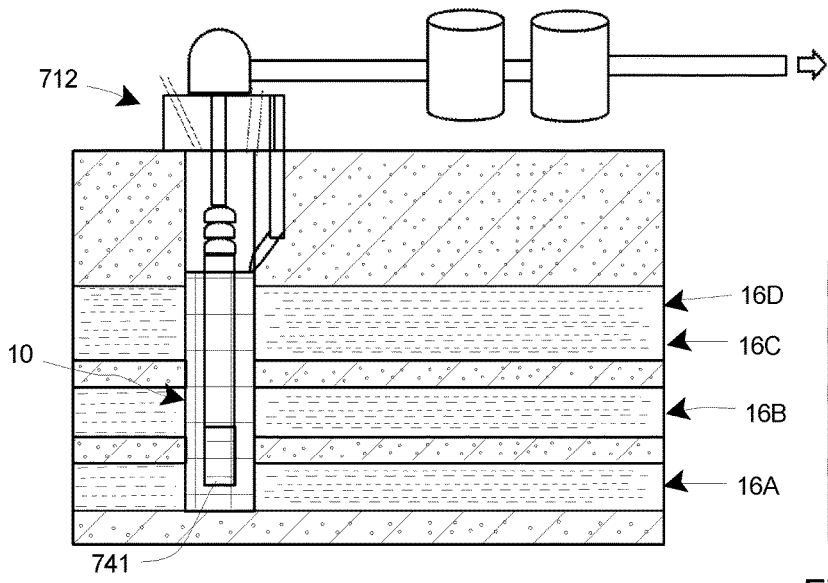
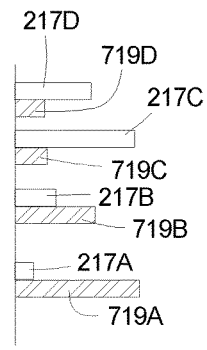
Fig. 7-1    Fig. 7-2 ated hydraulic forces between the pilot hole and the production well often lead to water quality results that are very different than expected and very disappointing when the new production well is turned on for the first time; or soon thereafter.

SELECTIVE EXTRACTION OF FLUIDS FROM SUBSURFACE WELLS

RELATED APPLICATION

This application claims priority under 35 U.S.C. 120 on U.S. patent application Ser. No. 13/917,057, filed on Jun. 13, 2013, entitled "SELECTIVE EXTRACTION OF FLUIDS FROM SUBSURFACE WELLS", and further claims priority under 35 U.S.C. § 119(e) on U.S. Provisional Application Ser. No. 61/659,740, filed Jun. 14, 2012 and entitled "SELECTIVE EXTRACTION AND OPTIMIZATION OF FLUIDS FROM SUBSURFACE WELLS". As far as permitted, the contents of U.S. patent application Ser. No. 13/917,057 and of U.S. Provisional Application Ser. No. 61/659,740 are incorporated herein by reference.

BACKGROUND

Quality grading of the groundwater supply and integration of selected subsurface water pumped directly into treatment and blending systems has been appreciably neglected for various reasons throughout the industrial revolution and more recently throughout the latter part of the $20^{th}$ century and the early part of the $21^{st}$ century. It is currently estimated by reputable sources that fresh groundwater constitutes less than one-third of 1% of the total water supply below and on the planet surface. Most of the fresh water supplies are tied up in the polar ice caps and provide an uneconomical solution to our short-term growing demand. Salt and brinish water are predominant, but the cost of desalination can be cost prohibitive as a result of being energy intensive. In many cases, water treatment technologies have not yet advanced in efficiency to the required price point to make the treatment of such salt and brinish water truly cost-effective. As a result, affordability can be problematic. Currently, desalination can cost approximately 2.5 to 3 times as much as the extraction of groundwater in most instances. Moreover, desalination to service millions of people would require extensive pipeline construction and management to bring fresh water from coastline areas to more inland regions. Complimentary to the need for efficient water transportation are the costs for maintaining such an extensive pipeline network. Hazardous waste then becomes another important issue in any desalination efforts.

From a brief recap of recent coastal historical disasters and construction failures, it becomes obvious that groundwater has some key advantages over fresh surface water and sea water. Less treatment, more localized to existing markets with lower transportation costs than surface water, and lower energy consumption are some of the reasons why so many communities throughout the world rely on groundwater as a precious resource. However, there are growing economic challenges with this resource as well, and as time advances we will likely see its price increase, perhaps dramatically.

Stratified water quality surrounding millions of subsurface wells, i.e. groundwater production wells, is presently an unknown, little explored resource. The reality is that there are vast supplies of clean groundwater and moderate quality groundwater in intermediate and deeper aquifers in the subsurface environments. However, little has been done to identify or understand the distribution of these resources and how they can be extracted at a lowest cost.

When a high-capacity production well is built in the ground it is typically constructed with a well casing having long lengths of perforated pipe called well screens. The long well screens are placed in vertical alignment with surrounding aquifers that produce water. Many of these wells have multiple sections of well screen that are depth-located with the surrounding aquifers. Although pilot or exploratory boreholes can be drilled prior to production well scale-up to identify zones of varying water quality, the hydrogeological data generated from the pilot-hole water quality zone-tests cannot simulate how the groundwater in the scale-up well will be pumped or blended with the well before it reaches the surface, over a long period of time (that being weeks, months and years). Zone tests within the pilot hole are economically limited in terms of testing time that is affordable and hydraulically limited due to the typically much lower pumping rates used for these tests. In the real world, production wells run on a continuous or semi-continuous basis and typically hydraulically engage each aquifer over a larger effective radius and vertical depth. As a result of these cost constraints, pumping time (only six to twelve hours for each zone), in a small diameter hole, and at a pumping rate that is typically less than that of the full scale-up production well, the results are often not comparable to a scale up well's performance. Thus, the window of physical testing and observation available with a pilot hole is quite small compared to the 24/7, 365 days per year use of the production subsurface well. There are instances where a disconnect occurs between the favorable results found in the pilot hole and the potentially unfavorable results from a scale-up well that is directly related to the differences of the hydraulic radius of influence of each pilot hole zone test in comparison to the larger radius of influence of the high-yield production wells. Quantitatively, the pumped draw-down differences between the pilot hole and the production are different, as well as in terms of the Bernoulli forces that depressurize the surrounding aquifers. The differences in formationally directed hydraulic forces between the pilot hole and the production well often lead to water quality results that are very different than expected and very disappointing when the new production well is turned on for the first time; or soon thereafter.

Fundamentally, it is difficult, if not impossible, for the pilot hole zone tests to simulate and reliably predict the zonal water quality and yield contributions that are blindly blended in various combinations inside the production well under greater hydraulic stresses. Plots of XY coordinate water quality discharge data from existing wells in combination with the limited zone test data from the pilot hole provide a fragmented picture of water quality distribution within the subsurface aquifers. When the well is constructed, the flow contribution from each water quality zone that is proportionally weighted against zonal chemistry is most often unknown. Oftentimes, the well is powered on with little thought as to how much water is produced from each zone and the resulting blended water quality.

SUMMARY

The present invention is directed toward a method for reducing the extent of treatment required for groundwater. In certain embodiments, the method comprises the steps of (A) determining one of groundwater (1) flow, and (2) chemistry within at least one of a plurality of fluid zones within a subsurface well having a primary pump positioned at least partially therein; (B) modifying fluid dynamics within the subsurface well based on at least one of the groundwater flow and chemistry; (C) selectively extracting groundwater from at least one of the plurality of fluid zones with the primary pump; and (D) removing one or more contaminants from the groundwater with a fluid treatment system.

In one embodiment, the step of determining includes the step of determining one of groundwater (1) flow, and (2) chemistry within at least one of the plurality of fluid zones within the subsurface well with miniaturized technologies. Additionally, the miniaturized technologies can include one or more of miniaturized flow profiling technologies, miniaturized water sampling technologies and miniaturized sensors.

Further, in one embodiment, the step of determining includes the step of determining one of groundwater (1) flow and (2) chemistry within at least one of the plurality of fluid zones within the subsurface well while the primary pump is turned on. Additionally and/or alternatively, the step of determining can include the step of determining one of groundwater (1) flow and (2) chemistry within at least one of the plurality of fluid zones within the subsurface well while the primary pump is turned off.

In one embodiment, the step of determining includes the step of determining each of groundwater (1) flow, and (2) chemistry within at least one of the plurality of fluid zones within the subsurface well having the primary pump positioned at least partially therein; within or between well screens or above all of the well screens.

Additionally, in one embodiment, the step of determining includes the step of determining one of groundwater (1) flow, and (2) chemistry within each of the plurality of fluid zones within the subsurface well having the primary pump positioned at least partially therein. Further, in such embodiment, the step of determining can include the step of determining each of groundwater (1) flow, and (2) chemistry within each of the plurality of fluid zones within the subsurface well having the primary pump positioned at least partially therein; within or between well screens or above all of the well screens.

Further, in one embodiment, the step of determining includes applying the continuity equation to determine zonal flow contribution(s) along the length of the well screen(s).

Further, in one embodiment, the step of determining includes applying the mass balance equation to determine zonal elemental and chemical contribution(s) of any analyte along the length of the well screen(s).

Further, in one embodiment, the step of determining includes applying the continuity and hydraulic conductivity equation in combination with pump test data to determine hydraulic conductivity of the formation(s) along the length of the well screen(s).

In certain embodiments, the step of modifying includes the step of blocking groundwater from one or more of the fluid zones from entering the subsurface well. For example, in one such embodiment, the step of modifying includes the step of installing one of a packer and a sleeve substantially adjacent to one or more of the fluid zones to block groundwater from the one or more fluid zones from entering the subsurface well. In another such embodiment, the step of modifying includes the step of pressure grouting one or more of the fluid zones to block groundwater from the one or more fluid zones from entering the subsurface well.

Additionally, in some embodiments, the step of modifying includes the step of altering one or more features of the primary pump. In one such embodiment, the step of determining includes the primary pump having a pump intake, and the step of altering includes the step of altering one or more of a location, a diameter and a design of the pump intake.

Further, in certain embodiments, the step of selectively extracting includes the step of selectively extracting the groundwater from at least two of the plurality of fluid zones with the primary pump. In one such embodiment, the step of selectively extracting includes controlling the proportion of groundwater being extracted from the at least two fluid zones.

In another application, the present invention is further directed toward a fluid extraction system for reducing the extent of treatment required for groundwater from a subsurface well, the subsurface well being positioned to access a plurality of fluid zones, the fluid extraction system comprising (A) a primary pump; (B) a fluid evaluation system that determines one of groundwater (1) flow, and (2) chemistry within at least one of the plurality of fluid zones within the subsurface well with the primary pump positioned at least partially therein; the primary pump selectively extracting groundwater from at least one of the plurality of fluid zones utilizing fluid dynamics within the subsurface well that have been modified based on at least one of the groundwater flow and chemistry as determined by the fluid evaluation system; and (C) a fluid treatment system that removes one or more contaminants from the groundwater.

Additionally, in still another application, the present invention is also directed toward a method for reducing the extent of treatment required for groundwater, the method comprising the steps of (A) determining with miniaturized technologies each of groundwater (1) flow, and (2) chemistry within each of a plurality of fluid zones within a subsurface well having a primary pump positioned at least partially therein; (B) modifying fluid dynamics within the subsurface well by at least one of (i) blocking groundwater from one or more of the fluid zones from entering the subsurface well and (ii) altering one or more features of the primary pump, the modifying being based on at least one of the groundwater flow and chemistry; (C) selectively extracting groundwater from at least one of the plurality of fluid zones with the primary pump; and (D) removing one or more contaminants from the groundwater with a fluid treatment system.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2-1 is a schematic illustration of the subsurface well and the fluid extraction system of FIG. 1, and FIG. 2-2 a graphical representation of an example of a relative level of contaminants that are present within a plurality of fluid zones in and/or near the subsurface well;

FIG. 3A-1 is a schematic illustration of the subsurface well and the fluid extraction system of FIG. 1, and FIG. 3A-2 a graphical representation of an example of a relative volume of fluid that can be extracted from each of the plurality of fluid zones within the subsurface well when the subsurface well and the fluid extraction system are in a pre-enhanced condition;

FIG. 4-1 is a schematic illustration of another embodiment of the subsurface well and the fluid extraction system illustrated in FIG. 1, and FIG. 4-2 is the graphical representation of the example of the relative level of contaminants as illustrated in FIG. 2-2, and the graphical representation of the example of the relative volume of fluid that can be extracted when the subsurface well and the fluid extraction system are in the pre-enhanced condition as illustrated in FIG. 3A-2;

FIG. 5-1 is a schematic illustration of the subsurface well and another embodiment of the fluid extraction system, the fluid extraction system having been altered in a first manner to allow for selective extraction of desired fluids from within the subsurface well, and FIG. 5-2 is the graphical representation of the example of the relative level of contaminants as illustrated in FIG. 2-2, and a graphical representation of an example of a relative volume of fluid that can be extracted from each of the fluid zones after the fluid extraction system has been altered in the first manner as shown in FIG. 5-1;

FIG. 6-1 is a schematic illustration of the subsurface well and still another embodiment of the fluid extraction system, the fluid extraction system having been altered in a second manner to allow for selective extraction of desired fluids from within the subsurface well, and FIG. 6-2 is the graphical representation of the example of the relative level of contaminants as illustrated in FIG. 2-2, and a graphical representation of an example of a relative volume of fluid that can be extracted from each of the fluid zones after the fluid extraction system has been altered in the second manner as shown in FIG. 6-1;

FIG. 7-1 is a schematic illustration of the subsurface well and yet another embodiment of the fluid extraction system, the fluid extraction system having been altered in a third manner to allow for selective extraction of desired fluids from within the subsurface well, and FIG. 7-2 is the graphical representation of the example of the relative level of contaminants as illustrated in FIG. 2-2, and a graphical representation of an example of a relative volume of fluid that can be extracted from each of the fluid zones after the fluid extraction system has been altered in the third manner as shown in FIG. 7-1;

FIG. 8-1 is a schematic illustration of the subsurface well and still another embodiment of the fluid extraction system, the fluid extraction system having been altered in a fourth manner to allow for selective extraction of desired fluids from within the subsurface well, and FIG. 8-2 is a graphical representation of the example of some of the relative level of contaminants as illustrated in FIG. 2-2, and a graphical representation of an example of a relative volume of fluid that can be extracted from each of the fluid zones after the fluid extraction system has been altered in the fourth manner as shown in FIG. 8-1;

FIG. 9-1 is a schematic illustration of the subsurface well and yet another embodiment of the fluid extraction system, the fluid extraction system having been altered in a fifth manner to allow for selective extraction of desired fluids from within the subsurface well, and FIG. 9-2 is a graphical representation of the example of some of the relative level of contaminants as illustrated in FIG. 2-2, and a graphical representation of an example of a relative volume of fluid that can be extracted from each of the fluid zones after the fluid extraction system has been altered in the fifth manner as shown in FIG. 9-1;

FIG. 10-1 is a schematic illustration of the subsurface well and another embodiment of the fluid extraction system, the fluid extraction system having been altered in a sixth manner to allow for selective extraction of desired fluids from within the subsurface well, and FIG. 10-2 is a graphical representation of the example of some of the relative level of contaminants as illustrated in FIG. 2-2, and a graphical representation of an example of a relative volume of fluid that can be extracted from each of the fluid zones after the fluid extraction system has been altered in the sixth manner as shown in FIG. 10-1;

FIG. 11-1 is a schematic illustration of the subsurface well and still another embodiment of the fluid extraction system, the fluid extraction system having been altered in a seventh manner to allow for selective extraction of desired fluids from within the subsurface well, and FIG. 11-2 is the graphical representation of the example of the relative level of contaminants as illustrated in FIG. 2-2, and a graphical representation of an example of a relative volume of fluid that can be extracted from each of the fluid zones after the fluid extraction system has been altered in the seventh manner as shown in FIG. 11-1;

FIG. 12-1 is a schematic illustration of the subsurface well and yet another embodiment of the fluid extraction system, the fluid extraction system having been altered in an eighth manner to allow for selective extraction of desired fluids from within the subsurface well, and FIG. 12-2 is the graphical representation of the example of the relative level of contaminants as illustrated in FIG. 2-2, and a graphical representation of an example of a relative volume of fluid that can be extracted from each of the fluid zones after the fluid extraction system has been altered in the eighth manner as shown in FIG. 12-1;

FIG. 13-1 is a schematic illustration of the subsurface well and another embodiment of the fluid extraction system, the fluid extraction system having been altered in a ninth manner to allow for selective extraction of desired fluids from within the subsurface well, and FIG. 13-2 is a graphical representation of the example of some of the relative level of contaminants as illustrated in FIG. 2-2, and a graphical representation of an example of a relative volume of fluid that can be extracted from each of the fluid zones after the fluid extraction system has been altered in the ninth manner as shown in FIG. 13-1;

FIG. 14-1 is a schematic illustration of the subsurface well and still yet another embodiment of the fluid extraction system, the fluid extraction system having been altered in a tenth manner to allow for selective extraction of desired fluids from within the subsurface well, and FIG. 14-2 is a graphical representation of the example of some of the relative level of contaminants as illustrated in FIG. 2-2, and a graphical representation of an example of a relative volume of fluid that can be extracted from each of the fluid zones after the fluid extraction system has been altered in the tenth manner as shown in FIG. 14-1.

DESCRIPTION

Figure 1:
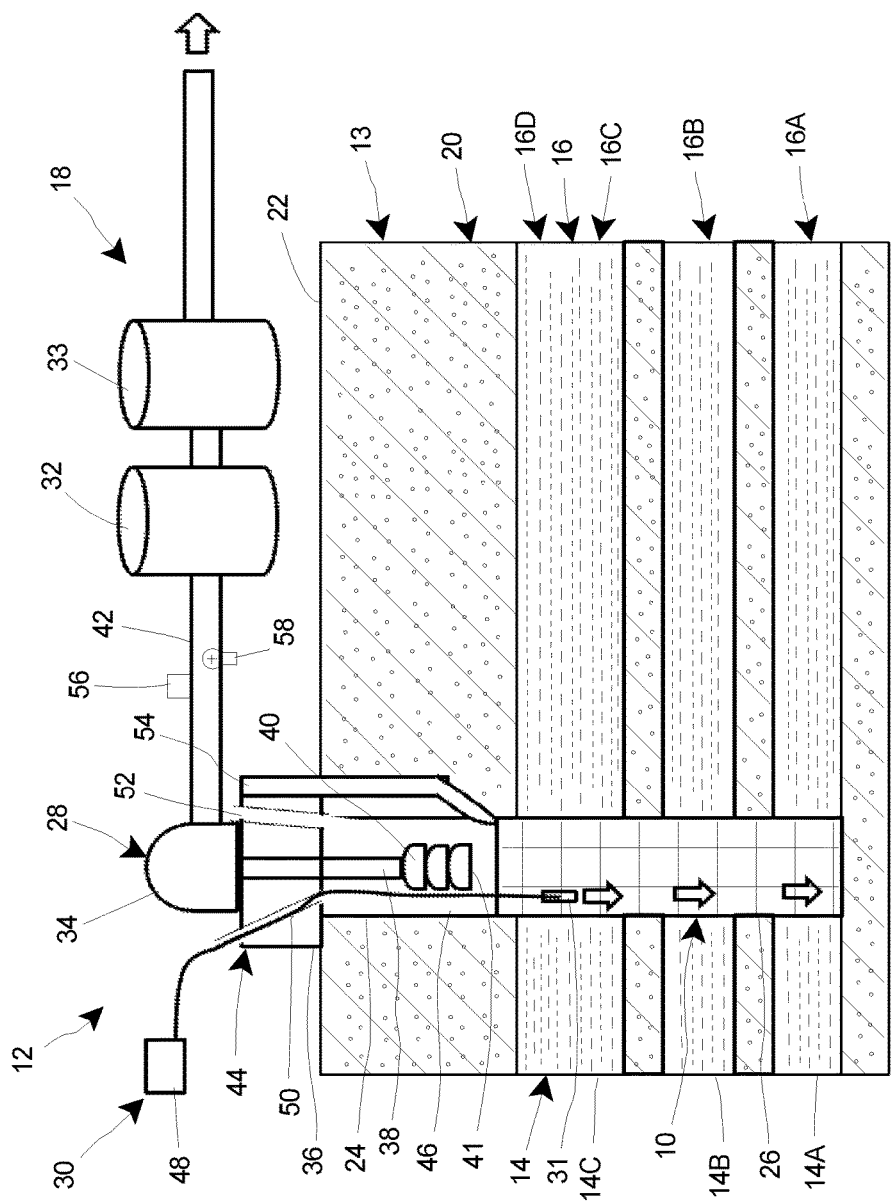
FIG. 1 is a schematic illustration of a subsurface well and an embodiment of a fluid extraction system having features of the present invention that is usable at least partially within the subsurface well.

FIG. 1 is a schematic illustration of a subsurface well 10 and an embodiment of a fluid extraction system 12 having features of the present invention that is usable within the subsurface well 10. As illustrated in the embodiment in FIG. 1, the subsurface well 10 provides access to one or more fluids, e.g., groundwater of varying quality, within a plurality of fluid zones or fluid regions in a subsurface environment 13. More particularly, the subsurface well 10 can provide access to one or more fluid sources 14 (e.g., aquifers, of which three are illustrated in FIG. 1), with each fluid source 14 including one or more fluid zones 16 or regions within the fluid source 14. As utilized herein, a "fluid zone" is a zone or region of fluid within the subsurface well 10 that can include a relatively consistent quality of fluid (i.e. a relatively consistent level of contaminants) throughout the fluid zone. For example, as illustrated in FIG. 1, the subsurface well 10 is positioned so as to provide access to a first fluid zone 16A within a first fluid source 14A (e.g., a first aquifer), a second fluid zone 16B within a second fluid source 14B (e.g., a second aquifer), and a third fluid zone 16C and a fourth fluid zone 16D within a third fluid source 14C (e.g., a third aquifer). In this example, each of the first fluid source 14A and the second fluid source 14B have a fairly consistent fluid quality (i.e. a fairly consistent level of contaminants) throughout the fluid source 14A, 14B so that such fluid sources 14A, 14B can be defined as having just a single respective fluid zone 16A, 16B. However, the third fluid source 14C has a fluid quality that varies to a greater extent than the first fluid source 14A and the second fluid source 14B. Accordingly, in this embodiment, the third fluid source 14C includes a plurality of fluid zones including the third fluid zone 16C and the fourth fluid zone 16D. It is understood in this example that in reality the third fluid source 14C (and any other fluid source) may actually have a continuum of fluid zones so that the level of contaminants varies across a spectrum moving from top to bottom within the third fluid source 14C. However for ease of discussion, FIG. 1 only illustrates two fluid zones 16C, 16D, recognizing that as a practical matter, the groundwater within any fluid zone is not likely to be completely homogeneous. Thus, each of the fluid sources 14A-14C can be defined as including any suitable number of fluid zones 16 as the groundwater quality will tend to vary somewhat within even a relatively small fluid source 14.

Additionally, it should be noted that the use of the terms "first fluid source", "second fluid source" and "third fluid source" are merely for purposes of illustration and ease of description, and any of the fluid sources 14A-14C can be described as the first fluid source, the second fluid source and/or the third fluid source. Similarly, it should also be noted that the use of the terms "first fluid zone", "second fluid zone", "third fluid zone" and "fourth fluid zone" are merely for purposes of illustration and ease of description, and any of the fluid zones 16A-16D can be described as the first fluid zone, the second fluid zone, the third fluid zone and/or the fourth fluid zone.

Typically, the quality of the groundwater (i.e. the levels of various contaminants) present within each of the fluid zones 16A-16D can vary relative to the quality of the groundwater in each of the other fluid zones 16A-16D. For example, in the embodiment illustrated in FIG. 1 (and as further illustrated in FIG. 2), the first fluid zone 16A can include and/or provide a high quality groundwater (a relatively low level of contaminants), the second fluid zone 16B can include and/or provide a moderate-to-high quality groundwater (a relatively low-to-moderate level of contaminants), the third fluid zone 16C can include and/or provide a low quality groundwater (a relatively high level of contaminants), and the fourth fluid zone 16D can include and/or provide a low-to-moderate quality groundwater (a relatively moderate-to-high level of contaminants). Alternatively, the quality of the groundwater in each of the fluid zones 16A-16D can be different than that described herein. Moreover, the specific application of the present invention, as described in detail herein below, will vary depending on quality of the groundwater in each of the fluid zones 16A-16D and the volume of groundwater desired to be extracted from each of the fluid zones 16A-16D.

As discussed herein, the contaminants that may be present within the groundwater can include, but are not limited to iron, manganese, arsenic, boron, fluoride, total dissolved solids, sodium, chloride, nitrate, sulfate, sulfide, hydrogen sulfide, uranium, bacteria, trichloroethylene, tetratchloroethylene, benzene, methylene chloride, etc. Additionally and/or alternatively, as referred to herein, the contaminants can include any of a variety of treatment interferrants, such as silica, orthophosphate, vanadium, chloride, total dissolved solids, carbon, nitrate, as non-exclusive examples, which can interfere with and/or inhibit the treatment of the groundwater that is extracted from the subsurface well 10.

Additionally, it should be understood that the level of any one contaminant within a given fluid zone 16 is not necessarily determinative of the level of any other contaminants within that fluid zone 16. As one particular non-exclusive example, the first fluid zone 16A can include a low level of contaminant A, a moderate level of contaminant B, and a low level of contaminant C; the second fluid zone 16B can have a low level of contaminant A, a low level of contaminant B, and a high level of contaminant C; the third fluid zone 16C can have a moderate level of contaminant A, a high level of contaminant B, and a high level of contaminant C; and the fourth fluid zone 16D can have a high level of contaminant A, a moderate level of contaminant B, and a moderate level of contaminant C.

Further, it should also be understood that in different applications of the present invention, certain contaminants may have a greater or lesser relevance or import depending on the specific focus of the particular application. For example, in a first application of the present invention, the user may only be interested in the particular level of contaminant A within a given volume of groundwater (such that it is only desired that contaminant A be specifically treated and/or removed from the groundwater); whereas in a second application of the present invention, the user may be interested in the particular levels of contaminant B and contaminant C within a given volume of groundwater (such that it is only desired that contaminant B and contaminant C be specifically treated and/or removed from the groundwater).

The subsurface well 10 can be installed using any one of a number of methods known to those skilled in the art. In non-exclusive, alternative examples, the subsurface well 10 can be installed with hollow stem auger, sonic, air rotary casing hammer, dual wall percussion, dual tube, rotary drilling, vibratory direct push, cone penetrometer, cryogenic, ultrasonic and laser methods, or any other suitable method known to those skilled in the art of drilling and/or well placement. As illustrated, the subsurface well 10 can be said to include a surface region 18 and a subsurface region 20. The surface region 18 is an area that includes the top of the subsurface well 10 which extends to and/or is positioned above a surface 22. The surface 22 can either be a ground surface or the surface of a body of water or other liquid, as non-exclusive examples. The subsurface region 20 is the portion of the subsurface well 10 that is below the surface 22 and below the surface region 18, e.g., at a greater depth than the surface region 18.

Additionally, as illustrated, the subsurface well 10 includes a well casing 24 and a well screen 26. The well casing 24 can be a hollow, generally cylinder-shaped structure that extends in a generally downward direction into the subsurface region 20 to help provide access to the groundwater, other fluids and/or other materials present within the subsurface region 20. The well casing 24 can have any desired thickness and can be formed from materials such as polyvinylchloride (PVC), other plastics, fiberglass, ceramics, metal, or other suitable materials. Additionally, the length of the well casing 24 can be varied to suit the specific design requirements of the subsurface well 10 and/or depending on the specific locations of the desired groundwater, other fluids and/or other materials within the subsurface environment 13. Further, an inner diameter of the well casing 24 can vary depending upon the specific design requirements of the subsurface well 10 and/or the fluid extraction system 12. It should be understood that although the well casing 24 is illustrated in the Figures as being positioned substantially vertically, the well casing 24 and the other structures of the subsurface well 10 can alternatively be positioned at any suitable angle relative to vertical.

The well screen 26 extends from and/or forms a portion of the well casing 24 within the subsurface environment 13. The well screen 26 can comprise a perforated pipe that provides an access means through which the fluids, e.g., the groundwater, enter the subsurface well 10. As illustrated, the well screen 26 is adapted to be positioned at a level within the subsurface environment 13 in vertical alignment with and/or substantially adjacent to the one or more fluid sources 14A-14C and/or the one or more fluid zones 16A-16D. It should be noted that although the well screen 26 is shown as extending the full depth and thickness of each of the fluid sources 14A-14C as well as between each of the fluid sources 14A-14C; the well screen 26 can alternatively be positioned in a more discretized manner, such that the well screen 26 is provided in a number of individual sections that are positioned only in vertical alignment with and/or substantially adjacent to one or more of the fluid sources 14A-14C or any portions thereof.

The design of the fluid extraction system 12 can vary depending on the specific requirements and characteristics of the subsurface well 10, and/or depending on the fluids available within the subsurface environment 13. In the embodiment illustrated in FIG. 1, the fluid extraction system 12 can include a primary pump assembly 28 (also referred to herein as the "primary pump" or simply the "pump"), a fluid evaluation assembly 30, a fluid treatment system 32 and a fluid blending system 33. Alternatively, the fluid extraction system 12 can have greater or fewer components than those specifically identified herein. For example, in one non-exclusive alternative embodiment, the fluid extraction system 12 can be designed without the fluid blending system 33.

As provided herein, the present invention is directed toward a fluid extraction system 12 that (i) determines, tests, evaluates, profiles and/or diagnoses one or more various characteristics of the groundwater within one or more of the plurality of fluid zones 16A-16D, e.g., in terms of fluid chemistry and/or fluid flow (it should be further noted that such determining can relate to dynamic and/or ambient fluid flow); (ii) modifies fluid dynamics within the subsurface well 10 based on the characteristics of the groundwater determined in step (i); (iii) performs deliberate down-hole blending of the groundwater through selective extraction, where groundwater is selectively removed from one or more of the fluid zones 16A-16D in controlled proportions; and (iv) subsequently combines these improved discharge results with downsized treatment (i.e. contaminant removal) and blending of the extracted groundwater as a single process unit.

Stated in another manner, the ideas and concepts described herein in relation to the present invention explain the value potential of a fully integrated, singly enhanced, connective fluid extraction system 12. It should be appreciated that if the cause of suboptimal groundwater production could be treated first, then the price of treatment, blending, and well rehabilitation could drop significantly, perhaps by as much as 50% to 90%. In particular, one or more advantages can occur when the cause of suboptimal groundwater production is addressed inside the well. For example, infrastructure costs can be reduced significantly; rate payers can see flatter price increases over time; and/or there can be decreased overall treatment of the groundwater (i.e. as compared to a substantially similar output volume of groundwater). These benefits can in turn result in less hazardous waste being generated from the treatment processes, less electricity being consumed, fewer pipelines being required, less land and habitat being disturbed, and/or less financial burden being placed on rate and tax payers. Moreover, such advantages can further result in rising property values, increased crop production at lower cost, and/or an increase in the number of bank loans for property development.

As used herein, the term "selective extraction" describes a process by which groundwater can be extracted from the fluid sources 14A-14C and/or the fluid zones 16A-16D by subsurface quality identification and subsequent controlled selection using various extraction methods. It should be understood that selective extraction can include selectively removing a discrete volume of groundwater from only one of the fluid zones 16A-16D or selectively removing a discrete volume of groundwater from more than one of the fluid zones 16A-16D. Additionally, it should be understood that when a discrete volume of groundwater is selectively extracted from more than one of the fluid zones 16A-16D, the volume of groundwater will have been or will be subjected to down-hole blending of the groundwater from more than one of the fluid zones 16A-16D. Moreover, the fluid extraction system 12, as described in detail herein, enables the precise controlling of the proportions of groundwater being selectively extracted from each of the fluid zones 16A-16D by means of appropriate modifications to the fluid dynamics within the subsurface well 10 such as described herein.

As an overview, through quality identification and selection, various grades of groundwater quality can be identified in a detailed or highly discretized fashion by using the fluid evaluation assembly 30 that includes advanced down-hole miniaturized technologies 31 inside various different groundwater production wells. The dimensions of these miniaturized technologies 31 (for example, in some embodiments, less than 1-inch outside diameter) included as part of the fluid evaluation assembly 30 are such that it is possible to enter or catheterize the subsurface well 10 without removal of the primary pump 28 from the subsurface well 10, i.e. with the primary pump 28 in situ. Additionally and/or alternatively, the miniaturized technologies must be small enough that the identification of the specifically desired characteristics of the groundwater, e.g., groundwater flow and chemistry, can be determined within one or more of the fluid zones 16A-16D within the subsurface well 10 having the primary pump 28 positioned at least partially therein. Bypassing the primary pump 28 without removal of the primary pump 28 from the subsurface well 10 or borehole can result in a significant cost savings to water producers and makes the acquisition of critically needed groundwater quality and production data affordable. Essentially, the down-hole, diagnostic miniaturized technologies 31 of the fluid evaluation assembly 30 create the data acquisition bridge that is required to greatly improve, enhance and/or optimize systems that bring water to market. Once identified in an existing subsurface well 10 or borehole, distinct grades of the groundwater existing within the subsurface well 10 can be selected through engineered means and extracted to the surface 22. Essentially, this is a "pick and choose" process where various grades of water quality can be plucked from the subsurface region 20, i.e. from one or more of the fluid zones 16A-16D, and fed directly into a distribution system (not illustrated), or into the fluid treatment system 32 and/or the fluid blending system 33, when necessary.

By selectively extracting the desired grades of groundwater from various depths within the subsurface region 20 of the subsurface well 10, a higher likelihood exists of achieving or approaching numerous life sustaining goals in a more economical manner. In particular, a desired output of the fluid extraction system 12 is to enable the minimizing of the overall level of treatment for a given volume of groundwater that is extracted from the subsurface well 10, given that at least a portion of the extracted groundwater is treated to remove one or more contaminants from the fluid. As utilized herein, the overall level of treatment refers to the summing of the individual levels of treatment that are applied to a given volume of groundwater times the volume of groundwater treated. By way of example, in certain applications, subjecting a small volume of extracted groundwater to a high level of treatment to produce treated groundwater, which is subsequently blended with a relatively large volume of untreated groundwater (i.e. groundwater that does not require and/or undergo any individualized treatment), can ultimately produce a given volume of usable water that requires a lower overall level of treatment as compared to an alternative system that subjects the full given volume of groundwater to a somewhat lower level of treatment.

Further, an increased probability of achieving or approaching the stated goals of the present invention can provide valuable benefits in the industries of potable drinking water supply, water treatment, groundwater well construction and rehabilitation, remedial treatment, agriculture, industrial processes in manufacturing and food production, refining, mining, energy and alternative energy, oceanographic engineering, and the like.

Moreover, as provided herein, the process of selective extraction as defined via more accurate, down-hole miniaturized technologies 31 is customized to each type of treatment and blending solution, i.e. within the fluid treatment system 32 and/or the fluid blending system 33, for the purpose of optimizing these surface based technologies.

The primary pump 28 provides a means to selectively remove groundwater from the subsurface well 10. As illustrated, the primary pump 28 can include a pump head 34, a pump support plate 36 (also sometimes referred to herein as a "support plate"), a pump column 38, one or more impeller pump bowls 40 (also referred to herein simply as "pump bowls"), and a pump intake 41. Alternatively, the primary pump 28 can have a different design. For example, the primary pump 28 can be designed with greater or fewer elements than those specifically illustrated in FIG. 1.

In this embodiment, the pump head 34 is positioned above the surface 22 and houses a pump motor (not illustrated) and a portion of a discharge pipe 42 (a portion of the discharge pipe 42 is illustrated extending to the right in FIG. 1 away from the pump head 34). As taught in various applications of the present invention, the pump motor selectively activates the pump 28 such that desired groundwater can be selectively extracted from one or more of the fluid zones 16A-16D.

The support plate 36 supports the pump head 34. Additionally, the support plate 36 can further support other portions of the primary pump 28 that are coupled to the pump head 34. As illustrated, in one embodiment, the support plate 36 can be positioned substantially adjacent to the surface 22 and can support the pump head 34 above the surface 22. Additionally, as described in greater detail herein below, in certain embodiments, the support plate 36 can provide an access port 44 for the miniaturized technologies 31 of the fluid evaluation assembly 30 to be inserted into the subsurface well 10 past the primary pump 28.

The pump column 38 is coupled to the pump head 34 and extends in a generally downward direction away from the pump head 34 into the subsurface region 20 of the subsurface well 10. The pump column 38 can be of any desired length depending on the specific requirements of the subsurface well 10 and/or the location of the fluid zones 16A-16D within the subsurface well 10.

As illustrated, the pump bowls 40 can be positioned at, near and/or adjacent to the end of the pump column 36 away from the pump head 34. Additionally, the pump bowls 40 can have the largest diameter of any portion of the primary pump 28 that is positioned within the subsurface region 20. Typically, the largest diameter of the primary pump 28 within the subsurface region 20 is fairly large relative to the size of the well casing 24 and the well screen 26, such that there is relatively small spacing, or annulus 46, between the primary pump 28 and the well casing 24 and/or the well screen 26.

In the embodiment illustrated in FIG. 1, the pump intake 41 is an opening for the groundwater to enter the pump column 38 and thereafter be transported to the surface 22 where the groundwater can be fed directly into a distribution system, the fluid treatment system 32 and/or the fluid blending system 33. In one embodiment, the pump intake 41 can be positioned substantially adjacent to the pump bowls 40. Alternatively, as illustrated in various embodiments described in detail herein below, the pump intake 41 can be positioned at a different location within the subsurface well 10, i.e. away from the pump bowls 40.

The depth set location of the pump intake 41 is derived from many factors that come into play such as 1) the depth of the groundwater and/or the fluid zones 16A-16D, 2) the pumping fluid level, 3) the rate of declining water table within the fluid sources 14A-14C, 4) the rate of recharge to the fluid sources 14A-14C, 5) the depth of the target zones to be pumped by the primary pump 28, and/or 6) the storage and transmissivity of the fluid sources 14A-14C themselves.

As provided herein, the down-hole miniaturized technologies 31, e.g., groundwater flow, water sampling and/or sensor technologies, of the fluid evaluation assembly 30 can enable accessing the subsurface well 10 for purposes of fluid evaluation without removal of the primary pump 28 and/or with the primary pump 28 positioned at least partially therein. The down-hole miniaturized technologies 31 can be inserted into the subsurface well 10 in various manners. In particular, the down-hole miniaturized technologies 31 can be inserted into the subsurface well 10 via the annulus 46 between the primary pump 28 and the well casing 24 and/or the well screen 26. As an example, a twelve-inch primary pump 28 can be placed inside of a sixteen-inch well casing 24 and/or well screen 26. If the primary pump 28 is perfectly centered inside the subsurface well 10, there would be a two-inch annulus 46 around the outside of the primary pump 28. However, because subsurface wells are rarely precisely straight, the primary pump 28 and/or pump column 38 commonly veer off-center with increasing depth so that the annulus 46 is very small on one side of the pump 28 and larger on the other side of the pump 28. Thus, in certain embodiments, the fluid extraction system 12 is designed such that the miniaturized technologies 31 can pass by the primary pump 28 and into the section of well 10 below the primary pump 28 on different sides of the primary pump 28, i.e. such that the miniaturized technologies 31 can pass by the primary pump 28 on the side with the larger annulus 46.

As illustrated in FIG. 1, the fluid evaluation system 30 can include an up-hole control unit 48 (also referred to herein simply as a "control unit") and the down-hole miniaturized technologies 31. The control unit 48 can control and/or regulate various processes related to the determining, profiling, testing, evaluating and/or diagnosing of the groundwater within the various fluid zones 16A-16D. For example, the control unit 48 can be used to control the administration of the miniaturized technologies 31 within the subsurface well 10, as well as for processing the results obtained from the miniaturized technologies 31 in order to calculate and/or derive the desired chemistry and flow contributions from each of the fluid zones 16A-16D within the subsurface well 10. In one embodiment, the control unit 48 can include a computerized system having one or more processors and circuits, and the control unit 48 can be programmed to perform one or more of the functions described herein. It is recognized that the positioning of the control unit 48 within the fluid extraction system 12 can be varied depending upon the specific requirements of the fluid extraction system 12. In other words, the positioning of the control unit 48 illustrated in FIG. 1 is not intended to be limiting in any manner.

When any given well is constructed, the flow contribution from each fluid zone 16A-16D, which is proportionally weighted against zonal chemistry, is unknown in most cases. Thus, it is desirable for the fluid evaluation system 30 to provide a cost-effective means to determine, profile, test, evaluate and/or diagnose the chemistry and flow contributions from each of the fluid zones 16A-16D within the subsurface well 10. As noted above, and as provided in detail herein, such means for determining, profiling, testing, evaluating and/or diagnosing the chemistry and flow contributions from each of the fluid zones 16A-16D can be accomplished through the use of the down-hole miniaturized technologies 31.

The use of the miniaturized technologies 31 helps to provide various potentially significant, economic and technological advantages. For example, use of the miniaturized technologies 31 allows for the use of the actual primary pump 28 during such diagnostic procedures. The advantage of using the primary pump 28 over a test pump is that the diagnostics are performed at the actual pumping rate of the well 10 and with unchanged dimensions with respect to the diameter of the pump intake 41, the pump bowls 40 and the pump column 38. The "Continuity Equation" defines the cumulative flow in a pipe as a function of the fluid velocity multiplied by the cross sectional area of the pipe. Changes in the flow rate (from a smaller test pump) and changes in the dimensions of the test pump when positioned below the top of the perforations of the production well can negatively impact the calculation of the down-hole cumulative flow rate. When the cumulative flow values from each depth are then integrated into the "Mass Balance Equation", systematic errors follow in calculating the zonal concentrations of undesired contaminants and treatment interferrants.

Moreover, the cost of profiling subsurface wells with the miniaturized technologies 31 can in certain applications be only 1% to 3% of the cost of a new well, well head or centralized treatment and/or blending facility. Therefore, the risk/reward ratio is much lower from the standpoint of financial risk and much greater from the standpoint of potential return on investment.

It may be desired to have different possibilities within the fluid extraction system 12 as to what can function as the access port 44 to enable the miniaturized technologies 31 to be inserted into the subsurface well 10 and positioned below the primary pump 28. For example, in certain non-exclusive alternative embodiments, the access port 44 can be provided by a support aperture 50, e.g., a vent pipe, a bolt hole and/or a drilled hole that extends through the support plate 36; a water level measurement port 52, which typically provides access for a transducer that can be used to measure the fluid level within the subsurface well 10; and/or a camera tube 54, which typically provides a means for visually observing, e.g., with a camera, what is going on within the subsurface well 10. As illustrated, the camera tube 54 can be positioned substantially outside the well casing 24, but can provide access to the interior of the well casing 24. With this design, the miniaturized technologies 31 can be effectively inserted into and/or positioned within the subsurface well 10 without the need of removing the primary pump 28. Additionally, this design helps to provide some of the economic (cost), technical and time-based advantages of the fluid extraction system 12. Alternatively, the access port 44 can be provided in a different manner than described herein, and/or the fluid extraction system 12 can be designed without one or more of the support aperture 50, the water level measurement port 52 and/or the camera tube 54.

As provided herein, the miniaturized technologies 31 can include one or more of (i) miniaturized flow profiling technologies (e.g., tracers, lasers, fiber optics, electronics, acoustics and/or any combination thereof); (ii) miniaturized water sampling technologies (e.g., bailers, pumps and/or passive samplers); and (iii) miniaturized sensors (e.g., fiber optic, laser, acoustic and/or electrical sensors). Additionally, it should be understood that the miniaturized technologies 31 can be moved to and/or positioned at various depth locations within the subsurface well 10 in order to provide appropriate measurements for the determination of chemistry and flow (e.g., both dynamic and ambient flow) characteristics of the groundwater at different points throughout the subsurface well 10. More specifically, in this embodiment, the miniaturized technologies 31 can be positioned within the subsurface well 10 to provide appropriate such measurements from each of the first fluid zone 16A, the second fluid zone 16B, the third fluid zone 16C and the fourth fluid zone 16D.

In the case of the use of the down-hole miniaturized technologies 31 for measuring cumulative flow, in certain embodiments, tracers can be used which asymptotically approach the specific gravity of water. In one such embodiment, the miniaturized technologies 31 can use a tracer approved by the National Sanitation Foundation called rhodamine red FWT 50—which is nontoxic, non-carcinogenic and biodegradable. With this design, for each of dynamic and ambient flow testing, the tracer is injected sideways within the well 10 such that the entire cross-sectional area of each measurement depth is blanketed by the tracer. The return curve formed when the tracer passes through a tracer detector (e.g., a fluorometer that may be positioned above and/or below the level at which the tracer is injected within the well 10) is the bulk average, cumulative flow rate at that depth. As noted, the use of such tracers for measuring cumulative flow can be utilized at various depths throughout the subsurface well 10. Subsequently, iterative algebraic subtraction between sequential pairs of cumulative flow values yield zonal contributions of fluid volume entering the well 10 over a given period of time (e.g., in gallons per minutes (GPM)). Once the flow values are derived from these miniaturized technologies 31, the cumulative flow data is integrated within the mass balance equation such that the associated cumulative chemistry at each depth is flow weighted through an iterative calculation. In this way, the zonal chemistry associated with each flow contribution zone is derived.

For purposes of water sampling, the miniaturized technologies 31 can include one or more bailers, pumps, passive samplers, and/or other appropriate water sampling devices as a means to remove water samples from within each of the fluid zones 16A-16D. Once removed, the water samples can then be tested to determine and/or define the level of any contaminants that may be present within the particular sample. More specifically, in some embodiments, the water samples can then be tested to determine and/or define the hydrogeochemical stratification of naturally occurring dissolved aqueous phase trace elements and minerals as well as anthropogenic contaminants (i.e. nitrate, perchlorate, organics, etc.). Additionally, as noted above, this can be accomplished without having to remove the primary pump 28 from the well 10. Moreover, it is the primary pump 28 that is used to discretize water quality along the length of the well 10 when performing constant pumping rate, steady state drawdown flow and water chemistry profiling tests (the "Dynamic Test"). The system process requires that the primary pump 28 be used and not removed from the well 10 in order to minimize potential damage to the well structure itself and to avoid the cost of removing the primary pump 28 and using a test pump for the dynamic test. Therefore, a minimally invasive process is defined in connection with water grading, selective extraction as well as selective treatment and blending. Following completion of the Dynamic Test, the primary pump 28 can be removed and a test pump used for proving out the results of the Dynamic Test. This is called a feasibility test. Although the feasibility test requires that the primary pump 28 be removed and a test pump used, the difference is that the minimally invasive, miniaturized water quality grading tools, i.e. the miniaturized technologies 31, make it so that the primary pump 28 and test pump only have to be removed and reinstalled one time, i.e. for the feasibility test and not for the dynamic test.

The use of the miniaturized technologies 31 in the form of sensors can be utilized for purposes of providing a one-time measurement of a single parameter of the fluid, multiple or ongoing measurements of a single parameter of the fluid, a one-time measurement of multiple parameters of the fluid, or multiple or ongoing measurements of multiple parameters of the fluid.

Thus, the diagnostic well catheterization with the miniaturized technologies 31 enables three components of production well water quality extraction, improvement and/or optimization for the fluid extraction system 12. The first component is economic improvement and/or optimization that precludes removing and installing the primary pump 28 and test pumps multiple times, i.e. only a maximum of one time for each is necessary. The second component is technical data quality improvement and/or optimization by means of obtaining highly reliable bulk average flow rates through sideways tracer injection at each measurement depth. The third component is the integration of the sideways injection derived bulk average flow rates into the mass balance equation to define zonal chemistry along the length of the well screen 26.

The bulk average cumulative flow rate at any point inside the well 10 is first defined by the Continuity Equation, which defines volumetric fluid transfer with conservation of mass and energy, in this case through a cylindrical pipe, as:

$$Q=A_1V_1=A_2V_2=\ldots=A_nV_n$$

where,

Q=Cumulative Flow in gallons per minute (GPM) or Percent;

$A_1$=Cross Sectional Area of a Cylinder at point 1 ($A=\pi r^2$); and $V_1$=Velocity of the fluid moving through A at point 1 (V=d/t).

From multiple measurements at different depths within the well 10, this fundamental equation can be applied repeatedly, thereby deriving a series of expressions where each zonal flow is derived from the difference in sequential cumulative flow measurements, with depth, and is represented by:

$$\text{Zonal Flow Depth } 1=Q_1-Q_2, \text{ Zonal Flow Depth } 2=Q_2-Q_3, \text{ Zonal Flow Depth } n=Q_n-Q_{n+1}.$$

From this basic calculation, the zonal flow contributions can be identified from the above as the difference between the two depth sequential cumulative flows as:

$$Q_1, Q_2, Q_3, \ldots, Q_{n+1}.$$

The sum of the fractional flows should equal the total flow from the well head (Well Head Discharge=Total Q), $$\Sigma Q_1+Q_2+Q_3+\ldots+Q=\text{Total } Q=\text{Flow Measured at Well Head Discharge Point}$$

The water quality grade associated within each flow zone is defined by the Mass Balance Equation, $$Ca=[(Q_1C_1)-(Q_2C_2)]/(Q_1-Q_2),$$

where,

Ca=average zonal, flow weighted concentration of any analyte between two depth sequential sampling points;

$Q_1$=Cumulative Flow at Depth 1;

$Q_2$=Cumulative Flow at Depth 2;

$C_1$=Cumulative Concentration of Analyte at Depth 1; and $C_2$=Cumulative Concentration of Analyte at Depth 2.

Next, the negative pressure field within the well can be defined, from the bottom of the pump impellers to some depth in the well defined by the vertical extent of the flow gradient. The negative pressure field is assumed to be a high frequency negative wave that propagates from the pump impellers to the bottom of the flow gradient. The bottom of the flow gradient is observed as a flow boundary indicator (FBI) characterized by, for example, rolling tracer returns to a surface-based fluorometer. Within the FBI, vertical capture by the pump transitions to ambient flow, below, within the remaining bottom section of the well. By understanding the flow distribution and the negative pressure wave characteristics by a series of down-hole, in well, sequentially spaced pressure measurements, and combining this data with the collocated flow distribution field, the character of the negative pressure field can be defined.

Bernoulli's principle defines many of the key forces at work within the groundwater production well and it is the vector-manipulation of these forces that provides the specific water quality of choice via selective extraction. Therefore, the first step is to define the flow and pressure field.

In fluid dynamics, Bernoulli's principle states that for an in viscid flow, an increase in the speed of the fluid occurs simultaneously with a decrease in pressure or a decrease in the fluid's potential energy. Thus, an increase in the speed of the fluid occurs proportionately with an increase in both its dynamic pressure and kinetic energy, and a decrease in its static pressure and potential energy. This is the fundamental ingredient that drives groundwater through a well screen, into the well and finally to the pump intake.

A common form of Bernoulli's equation, valid at any arbitrary point along a pipe where gravity is constant, is:

$$\frac{v^2}{2} + gz + \frac{p}{\rho} = \text{constant} \quad \text{(Eq. 1)}$$

where,
v=the fluid flow speed at a point on a streamline;
g=the acceleration due to gravity;
z=the elevation of the point above a reference plane, with the positive z-direction pointing upward, i.e. in the direction opposite to the gravitational acceleration;
P=the pressure at the chosen point; and
$\rho$=the density of the fluid at all points in the fluid.

In this case, gravity is assumed to be constant since the vertical distance between the pump intake and the vertical extent of the well screen is typically a relatively short distance. For conservative force fields, Bernoulli's equation can be generalized as:

$$\frac{v^2}{2} + \Psi + \frac{p}{\rho} = \text{constant} \quad \text{(Eq. 2)}$$

where, $\psi$ is the force potential at the point considered inside the vertical pipe. For example, for the Earth's gravity $\psi = gz$.

The following two assumptions must be met for this form of the Bernoulli equation to apply:
The flow must be incompressible, i.e. even though pressure varies, the density of the fluid must remain constant through the vertical pipe; and
Friction by viscous forces has to be negligible.

By multiplying with the fluid density $\rho$, Eq. 1 can be rewritten as:

$$\frac{1}{2}\rho v^2 + \rho gz + p = \text{constant} \quad \text{(Eq. 3)}$$

Or:

$$q + \rho gh = p_0 + \rho gz = \text{constant} \quad \text{(Eq. 4)}$$

where, $q = \frac{1}{2}\rho v^2$ = dynamic pressure;

$h = z + \frac{p}{\rho g}$ = the piezometric head or hydraulic head (the sum of the elevation $z$ and the pressure head);

and $p_0 = p + q$ = the total pressure (the sum of the static pressure $p$ and dynamic pressure $q$).

The constant in the Bernoulli equation can be normalized. A common approach is in terms of total head or energy head H:

$$H = z + \frac{p}{\rho g} + \frac{v^2}{2g} = h + \frac{v^2}{2g}, \quad \text{(Eq. 5)}$$

The above equations use a linear relationship between flow speed squared and pressure. It is important to remember that Bernoulli's principle does not apply in the boundary layer or in fluid flow through long pipes. While throughout much of a flow-field the effect of viscosity may be very small, a number of factors make the assumption of negligible viscosity invalid in many cases. Viscosity cannot be neglected near fluid boundaries because of the presence of a boundary layer (e.g., between the vena contracta and the inside wall of the well), which enhances the effect of even a small amount of viscosity. Turbulence is also observed in some high-Reynolds-number flows, and is a process through which energy is transferred to increasingly small scales of motion until it is dissipated by viscosity.

In fluid dynamics, the Darcy-Weisbach (DW) equation relates the head loss—or pressure loss—due to friction along a given length of pipe to the average velocity of the fluid flow. It is necessary to consider these losses with respect to use of selective extraction. In subsequent discussions, the DW equation can be applied in such a way that the average velocities within shorter intervals can be discretized as necessary to assist in controlling the process of selective extraction.

The Darcy-Weisbach equation contains a dimensionless friction factor, known as the Darcy friction factor. This is also called the Darcy-Weisbach friction factor. Head loss can be calculated with:

$$h_f = f_D \cdot \frac{L}{D} \cdot \frac{V^2}{2g}$$

where,
$h_f$ is the head loss due to friction (SI units: m);
L is the length of the pipe (m);
D is the hydraulic diameter of the pipe (for a pipe of circular section, this equals the internal diameter of the pipe) (m);
V is the average velocity of the fluid flow, equal to the volumetric flow rate per unit cross-sectional wetted area (m/s);
g is the local acceleration due to gravity (m/s$^2$); and
$f_D$ is a dimensionless coefficient called the Darcy friction factor, which can be found from a Moody diagram or more precisely by solving the Colebrook equation.

The head loss equation can further be expressed in terms of pressure loss. Given that the head loss $h_f$ expresses the pressure loss $\Delta p$ as the height of a column of fluid, $$\Delta p = \rho \cdot g \cdot h_f$$

where ρ is the density of the fluid, the Darcy-Weisbach equation can also be written in terms of pressure loss:

$$\Delta p = f_D \cdot \frac{L}{D} \cdot \frac{\rho V^2}{2}$$

where the pressure loss due to friction Δp (units: Pa or kg/ms$^2$) is a function of:
the ratio of the length to diameter of the pipe, L/D;
the density of the fluid, ρ (kg/m$^3$);
the mean velocity of the flow, V (m/s), as defined above; and
the Darcy friction factor; a (dimensionless) coefficient of laminar, or turbulent flow, $f_D$.

Thus, the pressure loss equation can be derived from the head loss equation by multiplying each side by ρ and g.

Away from the ends of the pipe, the characteristics of the flow are independent of the position along the pipe. The key quantities are then the pressure drop along the pipe per unit length, Δp/L, and the volumetric flow rate. The flow rate can be converted to an average velocity V by dividing by the wetted area of the flow (which equals the cross-sectional area of the pipe if the pipe is full of fluid). Therefore, the pressure drop between two points must be proportional to (½)ρV$^2$. Additionally, the pressure must be proportional to the length of the pipe between the two points L as the pressure drop per unit length is a constant. To turn the relationship into a proportionality coefficient of dimensionless quantity we can divide by the hydraulic diameter of the pipe, D, which is also constant along the pipe. Therefore, $$\Delta p \propto \frac{L}{D} \cdot \frac{1}{2}\rho V^2.$$

The proportionality coefficient is the dimensionless "Darcy friction factor" or "flow coefficient". This dimensionless coefficient will be a combination of geometric factors such as π, the Reynolds number and (outside the laminar regime) the relative roughness of the pipe (the ratio of the roughness height to the hydraulic diameter).

Note that (½)ρV$^2$ is not the kinetic energy of the fluid per unit volume, for various reasons. Even in the case of laminar flow, where all the flow lines are parallel to the length of the pipe, the velocity of the fluid on the inner surface of the pipe is zero due to viscosity, and the velocity in the center of the pipe must therefore be larger than the average velocity obtained by dividing the volumetric flow rate by the wet area. The average kinetic energy then involves the mean-square velocity, which always exceeds the square of the mean velocity. In the case of turbulent flow, the fluid acquires random velocity components in all directions, including perpendicular to the length of the pipe, and thus turbulence contributes to the kinetic energy per unit volume but not to the average lengthwise velocity of the fluid.

In hydraulic engineering applications, it is often desirable to express the head loss in terms of volumetric flow rate in the pipe. For this, it is necessary to substitute the following into the original head loss form of the Darcy-Weisbach equation:

$$V^2 = \frac{Q^2}{A_w^2}$$

where,
V is, as above, the average velocity of the fluid flow, equal to the volumetric flow rate per unit cross-sectional wetted area;
Q is the volumetric flow rate; and
$A_w$ is the cross-sectional wetted area.

For the general case of an arbitrarily-full pipe, the value of $A_w$ will not be immediately known, being an implicit function of pipe slope, cross-sectional shape, flow rate and other variables. If, however, the pipe is assumed to be full flowing and of circular cross-section, as is common in practical scenarios, then:

$$A_w^2 = \left(\frac{\pi D^2}{4}\right)^2 = \frac{\pi^2 D^4}{16}$$

where D is the diameter of the pipe. Substituting these results into the original formulation yields the final equation for head loss in terms of volumetric flow rate in a full-flowing circular pipe:

$$h_f = \frac{8fLQ^2}{g\pi^2 D^5}$$

where all symbols are defined as above. The head loss due to friction equation, that zone defined between the vena contracta and the inside wall surface of the pipe, can be combined with Bernoulli defined pressure drops between the vena contracta and the axial center of the pipe when pump suction forces are applied. Discretization of pumping forces within the well is instrumental in coaxing desirable sections of water quality from the surrounding formational materials.

When the fluid reaches an orifice, the fluid is forced to converge to go through the small hole; and the point of maximum convergence actually occurs shortly downstream of the physical orifice, at the so-called vena contracta point (see drawing above). As it does so, the velocity and the pressure change. Beyond the vena contracta, the fluid expands and the velocity and pressure change once again. By measuring the difference in fluid pressure between the normal pipe section and at the vena contracta, the volumetric and mass flow rates can be obtained from Bernoulli's equation.

By assuming steady-state, incompressible (constant fluid density), inviscid, laminar flow in a horizontal pipe (no change in elevation) with negligible frictional losses, Bernoulli's equation reduces to an equation relating the conservation of energy between two points on the same streamline:

$$P_1 + \frac{1}{2} \cdot \rho \cdot V_1^2 = P_2 + \frac{1}{2} \cdot \rho \cdot V_2^2$$

or:

$$P_1 - P_2 = \frac{1}{2} \cdot \rho \cdot V_2^2 - \frac{1}{2} \cdot \rho \cdot V_1^2$$

By continuity equation:

$$Q = A_1 \cdot V_1 = A_2 \cdot V_2 \text{ or}$$

$$V_1 = Q/A_1 \text{ and } V_2 = Q/A_2:$$

$$P_1 - P_2 = \frac{1}{2} \cdot \rho \cdot \left(\frac{Q}{A_2}\right)^2 - \frac{1}{2} \cdot \rho \cdot \left(\frac{Q}{A_1}\right)^2$$

Solving for Q:

$$Q = A_2 \sqrt{\frac{2(P_1 - P_2)/\rho}{1 - (A_2/A_1)^2}}$$

and:

$$Q = A_2 \sqrt{\frac{1}{1 - (d_2/d_1)^4}} \sqrt{2(P_1 - P_2)/\rho}$$

The above expression for Q gives the theoretical volume flow rate. Introducing the beta factor $\beta = d_2/d_1$ as well as the coefficient of discharge $C_d$:

$$Q = C_d A_2 \sqrt{\frac{1}{1 - \beta^4}} \sqrt{2(P_1 - P_2)/\rho}$$

and finally introducing the meter coefficient which is defined as $$C = \frac{C_d}{\sqrt{1 - \beta^4}}$$

to obtain the final equation for the volumetric flow of the fluid through the orifice:

$$Q = CA_2 \sqrt{2(P_1 - P_2)/\rho} \qquad (1)$$

Multiplying by the density of the fluid to obtain the equation for the mass flow rate at any section in the pipe:

$$\dot{m}\rho Q = CA_2 \sqrt{2\rho(P_1 - P_2)} \qquad (2)$$

where,
Q=volumetric flow rate (at any cross-section), m³/s;
ṁ=mass flow rate (at any cross-section), kg/s;
$C_d$=coefficient of discharge, dimensionless;
C=orifice flow coefficient, dimensionless;
$A_1$=cross-sectional area of the pipe, m²;
$A_2$=cross-sectional area of the orifice hole, m²;
$d_1$=diameter of the pipe, m;
$d_2$=diameter of the orifice hole, m;
β=ratio of orifice hole diameter to pipe diameter, dimensionless;
$V_1$=upstream fluid velocity, m/s;
$V_2$=fluid velocity through the orifice hole, m/s;
$P_1$=fluid upstream pressure, Pa with dimensions of kg/(m·s²);
$P_2$=fluid downstream pressure, Pa with dimensions of kg/(m·s²);
ρ=fluid density, kg/m³.

Deriving the above equations used the cross-section of the orifice opening and is not as realistic as using the minimum cross-section at the vena contracta. In addition, frictional losses may not be negligible and viscosity and turbulence effects may be present. For that reason, the coefficient of discharge $C_d$ is introduced. Methods exist for determining the coefficient of discharge as a function of the Reynolds number.

The drawdown equation outside of a pumping well has been defined as:

$$S = BQ + CQ^2,$$

where,
S=Total Drawdown Outside the well;
B=Linear Drawdown Coefficient in the surrounding formation under laminar flow;
C=Squared Drawdown Coefficient in the surrounding gravel pack, i.e. between the formation and the outside of the well; and
Q=Flow Rate.

The amount of drawdown (and the complimentary change in aquifer volume) should be directly proportional to the suction and frictional head loss forces at work inside the well and the corresponding volume produced from the well as a result. By combining the suction force as defined by the Bernoulli equation and the frictional head losses as defined by the Darcy Weisbach equation, in theory the sum of these two expressions should be equal to the volume of head loss surrounding the well for any given pumping rate and as defined as total drawdown or S. Moreover, the sum total of all flow through the orifices should be equal to the volumetric drawdown on the outside of the well casing and the volume discharged from the well.

Once the negative pressure field is defined within the pipe and in the areas directly adjacent to the perforations (orifices) and the vena contracta, the field can be theoretically changed to achieve the desired selective extraction results in terms of water quality, as well as in terms of productive depth preferences. All of these measurements are exclusively facilitated by means of the data gathering miniaturized technologies 31 for flow, pressure and water chemistry that are obtained without removal of the primary pump 28 during the course of these tests.

Once all the various parameters have been effectively determined, profiled, tested, evaluated and/or diagnosed with the miniaturized technologies 31, and all of the necessary calculations have been made, e.g., with the control unit 48, the layers of zonal water quality can now be identified and harvested as desired according to their water quality grade. Stated in another manner, at this point, knowing the chemical and/or flow characteristics of the groundwater in each of the fluid zones 16A-16D, the groundwater from one or more of the fluid zones 16A-16D can be selectively extracted as desired. As provided herein, the means for modifying the fluid dynamics within the subsurface well 10 and/or for adjusting the withdrawal of groundwater from one or more of the fluid zones 16A-16D, i.e. the means for enabling selective extraction of the groundwater from one or more of the fluid zones 16A-16D, can include: 1) changing the pumping rate, 2) changing the location of the pump intake 41, 3) changing the diameter of the pump intake 41, 4) installing a packer or sleeve below, above or adjacent to an undesirable water quality zone, 5) use of engineered suctions otherwise called fluid velocity controllers, 6) change in the well depth or well diameter, 7) pressure grouting undesirable zones where the undesired water is blocked from entering the well 10, 8) focused rehabilitation where select zones are unclogged and other zones remain clogged to achieve desirable water quality results and/or 9) the combination of any of these selective extraction measures in direct combination with treatment or blending; where improvement and/or optimization are unified between the subsurface and surface structures. Additionally and/or alternatively, other means for enabling selective extraction of the groundwater from the fluid zones 16A-16D may also be utilized.

It is category 9 that is of particular interest with the present invention, i.e. where the selective extraction goals determined through use of the miniaturized technologies 31 are integrated with enhanced surface treatment and blending of the groundwater in the fluid treatment system 32 and/or the fluid blending system 33. Although improved water quality results can be achieved by means of categories 1 through 8, often times, the water quality results may not be improved enough. In these cases, the process of selective extraction via more accurate down-hole miniaturized technologies 31 can be customized to each type of treatment and blending solution for the purpose of improving and/or optimizing these conventional surface-based technologies. Down-hole diagnostic data results derived from the use of the miniaturized technologies 31 can be improved, enhanced and/or optimized via selective extraction of the desired groundwater, e.g., groundwater that has been selectively blended within the well 10 as and if desired, and selective utilization of the fluid treatment system 32 and/or the fluid blending system 33 to provide an increased total volume of groundwater at the decreased overall treatment level.

As illustrated in FIG. 1, the fluid extraction system 12 can further include the discharge pipe 42, a flow meter 56 and a fluid drainer 58, e.g., a tap, that are positioned between the primary pump 28 and the fluid treatment system 32 and/or between the primary pump 28 and the fluid blending system 33. The discharge pipe 42 provides a means for moving and/or transferring the fluid, i.e. the selectively extracted groundwater, from the primary pump 28 to the fluid treatment system 32 and/or the fluid blending system 33. Additionally, the flow meter 56 measures the volume of the groundwater that is being moved and/or transferred from the primary pump 28 to the fluid treatment system 32 and/or the fluid blending system 33. Further, the fluid drainer 58 provides a means for selectively removing or draining groundwater, e.g., a small volume of groundwater, from the discharge pipe 42 for testing or other appropriate purposes prior to the groundwater reaching the fluid treatment system 32 and/or the fluid blending system 33.

The fluid treatment system 32 can receive one or more volumes of selectively extracted groundwater that are removed from the well 10 via the primary pump 28, and can subsequently treat such groundwater as desired to provide one or more volumes of treated groundwater. It should be understood that the level of treatment provided for any given volume of selectively extracted groundwater can vary from the level of treatment provided for any other given volume of selectively extracted groundwater. For example, when the primary pump 28 is being utilized to selectively extract higher quality groundwater from the well 10, the fluid treatment system 32 may only be required to perform little or no treatment on such groundwater (i.e. little or no contaminants will be needed to be removed from the groundwater), before the groundwater is transferred to the fluid blending system 33 and/or to an appropriate distribution network. More specifically, with such higher quality groundwater, the groundwater may bypass the fluid treatment system 32 completely and be transferred directly from the primary pump 28 to the fluid blending system 33 and/or to an appropriate distribution network. Conversely, when the primary pump 28 is being used to selectively extract lower quality groundwater from the well 10, the fluid treatment system 32 will be required to perform an increased level of treatment on such groundwater (i.e. a greater number of contaminants will need to be removed from the groundwater) prior to such treated groundwater being transferred to the fluid blending system 33 and/or to an appropriate distribution network.

The fluid blending system 33 can be utilized to blend together one or more volumes of treated groundwater and/or one or more volumes of untreated groundwater, e.g., one or more volumes of groundwater that bypass the fluid treatment system 32. In one exemplary application, the fluid blending system 33 can be utilized to blend together a first volume of treated groundwater, which has received a high level of treatment; a second volume of treated groundwater, which has received a moderate level of treatment; a third volume of treated groundwater, which has received a low level of treatment; and a fourth volume of untreated groundwater, which has received no treatment. Alternatively, the fluid blending system 33 can be utilized to blend together a different number of discrete volumes of groundwater, and the different volumes of groundwater can have received different levels of treatments from the fluid treatment system 32 and/or can have received no treatment at all from the fluid treatment system 32.

Based on the teachings as provided herein, the groundwater can be selectively extracted from the well 10 by altering the fluid dynamics of the fluid extraction system 12, e.g., the pump assembly 28, and/or the well 10 itself, such that a increased volume of groundwater can be provided with a decreased level of overall treatment required within the fluid treatment system 32. Additionally, the fluid dynamics can be selectively modified within the subsurface well 10 based on one or more of the (i) groundwater flow, and (ii) groundwater chemistry, as determined by the fluid evaluation system 30 within the fluid zones 16A-16D. Stated another way, the fluid extraction system 12 of the present invention provides technical and economic advantages that can help to improve, enhance and/or optimize the groundwater removal and usage capabilities of nearly any subsurface well 10.

For example, in one application, after groundwater flow and/or groundwater chemistry has been determined within at least one of the plurality of fluid zones 16A-16D, fluid dynamics can be modified within the subsurface well 10 based on at least one of the groundwater flow and groundwater chemistry, a quantity of groundwater can be selectively extracted from at least one of the fluid zones 16A-16D with the primary pump 28, and one or more contaminants can be removed from the extracted groundwater with the fluid treatment system 32. By selectively modifying the fluid dynamics within the subsurface well 10 prior to extracting groundwater from the subsurface well 10 with the primary pump 28, a higher quality and/or higher volume of groundwater can be selectively extracted from the subsurface well 10, which requires a lower overall level of treatment. Thus, a greater quantity of usable groundwater can be extracted from the subsurface well 10 at a lower cost (due to more limited treatment requirements) than would otherwise be possible if only good water is extracted (that requires no treatment) or if a full volume of water is treated (not discretely extracted and treated).

Alternatively, in another application, an amount of low quality groundwater can be selectively extracted from the subsurface well 10 and transferred to the fluid treatment system 32. The low quality groundwater can then be treated within the fluid treatment system 32 to remove a desired amount of contaminants to provide a treated low quality groundwater. Additionally, an amount of high (or moderate) quality groundwater can be selectively extracted that needs little or no treatment within the fluid treatment system 32. Subsequent to any treatment performed on the groundwater, the treated low quality groundwater can be blended with the high (or moderate) quality groundwater within the fluid blending system 33 to provide a greater quantity of usable groundwater at a lower cost (due to limited treatment) than would otherwise be possible.

Figures 1, 2, 8:
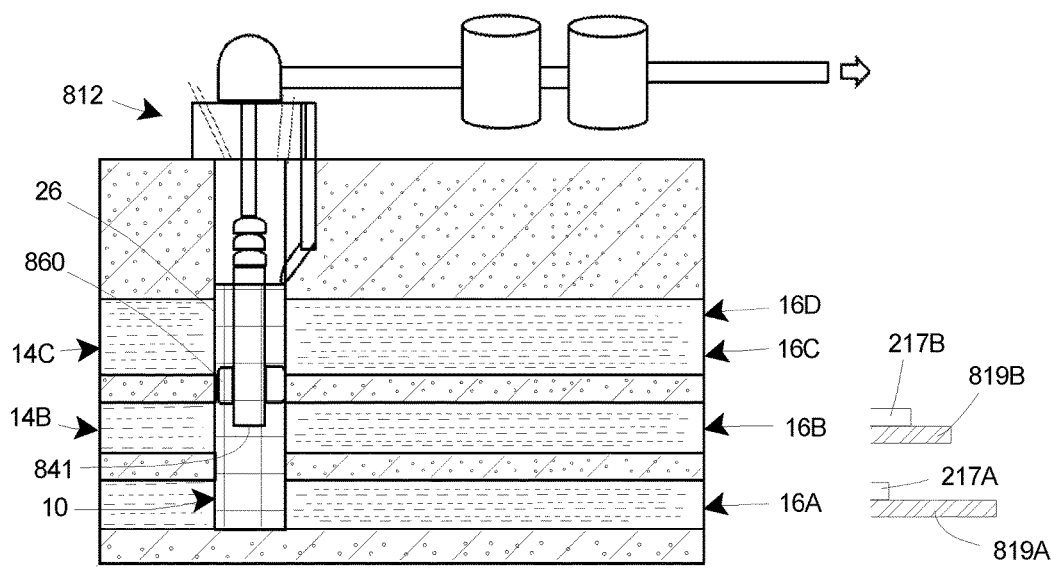

FIG. 2-1 is another schematic illustration of the subsurface well 10 and the fluid extraction system 12. Additionally, FIG. 2-2 provides a graphical representation of an example of a relative level of contaminants 217A-217D (illustrated with empty rectangular boxes) that can be found within each of the plurality of fluid zones 16A-16D, respectively, within the subsurface well 10. It should be understood that as illustrated in FIGS. 2-1 and 2-2, as well as in other Figures throughout the present application, the relative level of contaminants 217A-217D for each of the fluid zones 16A-16D is graphically illustrated substantially directly adjacent to the number indicating each of the fluid zones 16A-16D. More specifically, the relative level of contaminants 217A for the first fluid zone 16A is graphically illustrated substantially directly adjacent to the reference number "16A" indicating the first fluid zone; the relative level of contaminants 217B for the second fluid zone 16B is graphically illustrated substantially directly adjacent to the reference number "16B" indicating the second fluid zone; the relative level of contaminants 217C for the third fluid zone 16A is graphically illustrated substantially directly adjacent to the reference number "16C" indicating the third fluid zone; and the relative level of contaminants 217D for the fourth fluid zone 16A is graphically illustrated substantially directly adjacent to the reference number "16D" indicating the fourth fluid zone.

In this embodiment, as illustrated in FIG. 2-2, the relative level of contaminants 217A-217D is highest in the third fluid zone 16C, next highest in the fourth fluid zone 16D, much lower in the second fluid zone 16B, and at a lowest level in the first fluid zone 16A. Stated in another manner, relatively speaking, the third fluid zone 16C can be said to include a low quality groundwater (i.e. with a high level of contaminants 217C), the fourth fluid zone 16D can be said to include a low-to-moderate quality groundwater (i.e. with a moderate-to-high level of contaminants 217D), the second fluid zone 16B can be said to include a moderate-to-high quality groundwater (i.e. with a low-to-moderate level of contaminants 217B), and the first fluid zone 16A can be said to include a high quality groundwater (i.e. with a low level of contaminants 217A). It should be understood that the relative level of contaminants 217A-217D in each fluid zone 16A-16D as shown in FIG. 2-2 is merely for purposes of illustration and ease of description, and the relative level of contaminants 217A-217D in any given fluid zone 16A-16D can be different than that specifically illustrated in FIG. 2-2 without deviating from the intended breadth and scope of the present invention.

Moreover, as noted above, the relative level of contaminants 217A-217D as illustrated herein can relate to one or more of numerous types of contaminants and/or treatment interferrants. For example, the relative level of contaminants 217A-217D can relate to one or more of iron, manganese, arsenic, boron, fluoride, total dissolved solids, sodium, chloride, nitrate, sulfate, sulfide, hydrogen sulfide, uranium, bacteria, trichloroethylene, tetratchloroethylene, benzene, methylene chloride, etc. Additionally, it should be understood that the relative level of any one contaminant can be different within any given fluid zone than the relative level of any of the other contaminants. As one non-exclusive, representative example, the first fluid zone 16A can have a relatively low level of iron and fluoride, a relatively moderate level of uranium, and a relatively high level of arsenic. Moreover, when discussing treatment of the extracted groundwater within the fluid treatment system 32, the groundwater can be treated for purposes of removing and/or minimizing any one or more of the contaminants that may be present in the groundwater.

FIG. 3A-1 is another schematic illustration of the subsurface well 10 and the fluid extraction system 12. Additionally, FIG. 3A-2 further provides a graphical representation of an example of a relative volume of groundwater 319A-319D (illustrated with rectangular boxes with angled lines within) that can be extracted from each of the plurality of fluid zones 16A-16D, respectively, within the subsurface well 10 when the subsurface well 10 and the fluid extraction system 12 are in a pre-enhanced condition. Stated in another manner, FIG. 3A-2 illustrates the relative volume of groundwater 319A-319D that would be extracted from within each of the fluid zones 16A-16D prior to any modifications being made to the fluid dynamics within the subsurface well 10, and/or any adjustments being made to the subsurface well 10 and/or the fluid extraction system 12 for purposes of selectively extracting the desired groundwater (i.e. based on the determining, profiling, testing, evaluating and/or diagnosing of the fluid chemistry and fluid flow characteristics of the groundwater from within each of the fluid zones 16A-16D with the miniaturized technologies 31).

It should be understood that as illustrated in FIGS. 3A-1 and 3A-2, as well as in other Figures throughout the present application, the relative volume of groundwater 319A-319D that would be extracted from within each of the fluid zones 16A-16D is graphically illustrated substantially directly adjacent to the number indicating each of the fluid zones 16A-16D. More specifically, the relative volume of groundwater 319A that would be extracted from within the first fluid zone 16A is graphically illustrated substantially directly adjacent to the reference number "16A" indicating the first fluid zone; the relative volume of groundwater 319B that would be extracted from within the second fluid zone 16B is graphically illustrated substantially directly adjacent to the reference number "16B" indicating the second fluid zone; the relative volume of groundwater 319C that would be extracted from within the third fluid zone 16A is graphically illustrated substantially directly adjacent to the reference number "16C" indicating the third fluid zone; and the relative volume of groundwater 319D that would be extracted from within the fourth fluid zone 16A is graphically illustrated substantially directly adjacent to the reference number "16D" indicating the fourth fluid zone.

As shown in the embodiment illustrated in FIG. 3A-2, when the subsurface well 10 and the fluid extraction system 12 are in the pre-enhanced condition, the relative volume of groundwater 319A-319D removed can be greatest from the fourth fluid zone 16C, next highest from the third fluid zone 16C, next highest from the second fluid zone 16B, and lowest from the first fluid zone 16A. As provided herein, the different volumes of groundwater being extracted from each of the fluid zones 16A-16D while the subsurface well 10 and the fluid extraction system 12 are in the pre-enhanced condition can relate to one or more of the pumping rate of the primary pump 28, the location and size of the pump intake 41, the location of the fluid zones 16A-16D within the subsurface well 10, the specific design of the subsurface well 10 and/or the fluid extraction system 12, and/or other additional variables. It should be understood that the specific relative fluid flows from the fluid zones 16A-16D, as shown in FIG. 3A-2, while the subsurface well 10 and the fluid extraction system 12 are in the pre-enhanced condition are merely for purposes of illustration and ease of description, and such illustrated fluid flows are not intended to be limiting in any manner.

Figure 3B:
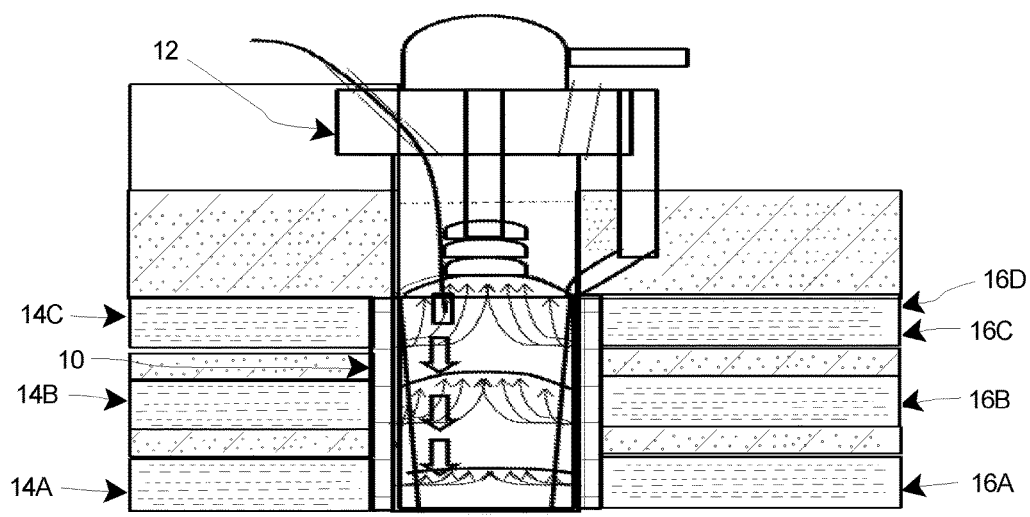
FIG. 3B is a schematic illustration of the subsurface well and a portion of the fluid extraction system of FIG. 1, and a visual representation of an example of a relative fluid flow from each of the plurality of fluid zones within the subsurface well when the subsurface well and the fluid extraction system are in the pre-enhanced condition.

FIG. 3B is a schematic illustration of the subsurface well 10 and a portion of the fluid extraction system 12, and a visual representation of an example of a relative fluid flow from each of the plurality of fluid zones 16A-16D within the subsurface well 10 when the subsurface well 10 and the fluid extraction system 12 are in the pre-enhanced condition. As relates to FIG. 3A specifically, the relative fluid flow from each of the fluid zones 16A-16D (illustrated by arrows, with longer arrows demonstrating increased fluid flow) shows that in this embodiment, the fluid flow in the pre-enhanced condition is strongest from within the third fluid source 14C, i.e. from the third fluid zone 16C and/or the fourth fluid zone 16D; more moderate from within the second fluid source 14B, i.e. from the second fluid zone 16B; and weakest from within the first fluid source 14A, i.e. from the first fluid zone 16A.

Figure 3C:
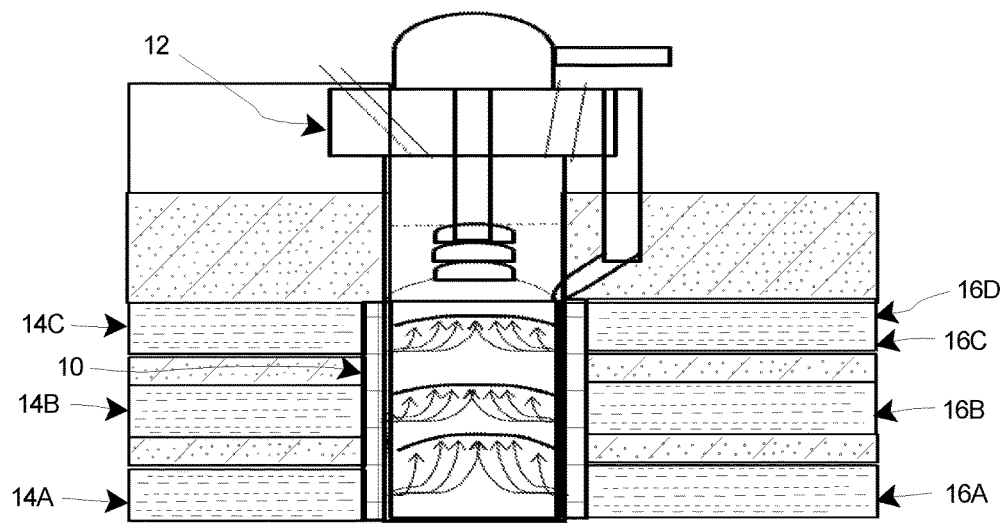
FIG. 3C is a schematic illustration of the subsurface well and a portion of the fluid extraction system of FIG. 1, and a visual representation of an example of an adjusted relative fluid flow from each of the plurality of fluid zones within the subsurface well when the subsurface well and/or the fluid extraction system are in an adjusted condition.

FIG. 3C is a schematic illustration of the subsurface well 10 and a portion of the fluid extraction system 12, and a visual representation of an example of an adjusted, relative fluid flow from each of the plurality of fluid zones 16A-16D within the subsurface well 10 when the subsurface well 10 and the fluid extraction system 12 are in an adjusted condition; i.e. after fluid dynamics have been modified within the subsurface well 10. More particularly, FIG. 3C illustrates the relative fluid flow from each of the plurality of fluid zones 16A-16D (illustrated by arrows, with longer arrows demonstrating increased fluid flow) after the surface well 10 and/or the fluid extraction system 12 have been enhanced with the desire to extract a greater volume of groundwater from the first fluid zone 16A and the second fluid zone 16B, i.e. from within the first fluid source 14A and the second fluid source 14B, respectively; and a lesser volume of groundwater from the third fluid zone 16C and the fourth fluid zone 16D, i.e. from the third fluid source 14C.

FIG. 4-1 is a schematic illustration of the subsurface well 10 and the fluid extraction system 12. Additionally, FIG. 4-2 illustrates the graphical representation of the example of the relative level of contaminants 217A-217D (illustrated with empty rectangular boxes) that can be found within each of a plurality of fluid zones 16A-16D, respectively, within the subsurface well 10 as illustrated in FIG. 2-2, and the graphical representation of the example of the relative volume of groundwater 319A-319D (illustrated with rectangular boxes with angled lines within) that can be extracted from each of the plurality of fluid zones 16A-16D, respectively, within the subsurface well 10 when the subsurface well 10 and the fluid extraction system 12 are in the pre-enhanced condition as illustrated in FIG. 3A-2.

As detailed herein, in certain applications, in comparison to the pre-enhanced condition, it is desired to extract a greater relative volume of groundwater from the first fluid zone 16A and the second fluid zone 16B, i.e. the high quality groundwater and the moderate-to-high quality groundwater, and a lesser relative volume of groundwater from the third fluid zone 16C and the fourth fluid zone 16D, i.e. the low quality groundwater and the moderate-to-low quality groundwater. Stated in another manner, it can be desired to enable controlled in-well blending of groundwater from one or more of the fluid zones 16A-16D in precise proportions. For example, in some such applications, it can be desired that approximately 100% of the groundwater extracted from the subsurface well 10 be extracted from the first fluid zone 16A and/or the second fluid zone 16B, and approximately 0% of the groundwater extracted from the subsurface well 10 be extracted from the third fluid zone 16C and the fourth fluid zone 16D.

Additionally, as described in detail herein, one or more aspects, characteristics or parameters of the fluid extraction system 12 and/or the subsurface well 10 can be altered in many different manners as a means to modify fluid dynamics within the subsurface well 10 and thus enable the selective extraction of desired groundwater from within the different fluid zones 16A-16D. For example, as noted above, the means for altering the fluid extraction system 12 and/or the subsurface well 10 for purposes of modifying fluid dynamics to enable selective extraction can include one or more of 1) changing the pumping rate, 2) changing the location of the pump intake, 3) changing the diameter of the pump intake nozzle, 4) installing a packer or sleeve below or above an undesirable water quality zone, 5) use of engineered suctions otherwise called fluid velocity controllers, 6) change in the well depth or well diameter, 7) pressure grouting undesirable zones where the undesired water is blocked from entering the well, and 8) focused rehabilitation where select zones are unclogged and other zones remain clogged to achieve desirable water quality results. Additionally, it should be understood that any of the above-noted means can be combined in any suitable manner to further enable the selective extraction of desired groundwater from within the fluid zones 16A-16D. Moreover, such means for selective extraction can be utilized in various alternative applications in conjunction with the subsequent treatment and blending of the groundwater as part of the overall optimization process.

FIG. 5-1 is a schematic illustration of the subsurface well 10 and another embodiment of the fluid extraction system 512. As illustrated in FIG. 5-1, the fluid extraction system 512 and/or the subsurface well 10 have been altered in a first manner to modify fluid dynamics and thus allow for selective extraction of desired groundwater from within the subsurface well 10. Stated in another manner, FIG. 5-1 illustrates the fluid extraction system 512 in a first enhanced condition. As shown, the first enhanced condition includes moving the location of the pump intake 541 such that the pump intake 541 is at a position much closer to the desired first fluid zone 16A and the second fluid zone 16B. Additionally and/or alternatively, the first enhanced condition (or a substantially similar enhanced condition) may also be accomplished by changing the pumping rate of the primary pump 528, as an increased pumping rate (all other factors equal) will tend to extract greater volumes of groundwater that are farther away from the fluid intake 541 than a lower pumping rate.

Additionally, FIG. 5-2 further illustrates a graphical representation of the example of the relative level of contaminants 217A-217D (illustrated with empty rectangular boxes) that can be found within each of the plurality of fluid zones 16A-16D, respectively, within the subsurface well 10. As shown, the level of contaminants 217A-217D in each fluid zone 16A-16D is the same as illustrated in FIG. 2-2, i.e. the level of contaminants 217A-217D in each fluid zone 16A-16D is just the natural condition of the fluid zones 16A-16D and does not change due to adjustments made to the fluid extraction system 512 such as moving the location of the pump intake 541.

Further, FIG. 5-2 also illustrates that based on the movement of the location of the pump intake 541, the relative volume of groundwater 519A-519D extracted from each of the fluid zones 16A-16D (illustrated with rectangular boxes with angled lines within), respectively, is different than such flows existed when the fluid extraction system 512 and the subsurface well 10 were in the pre-enhanced condition. In particular, in the illustrated first enhanced condition, the greatest volume of groundwater is extracted from the first fluid zone 16A, the next highest volume of groundwater is extracted from the second fluid zone 16B, and a much lower volume of groundwater is extracted from each of the third fluid zone 16C and the fourth fluid zone 16D. It should be understood that the specific relative volumes of groundwater 519A-519D that are extracted from each fluid zone 16A-16D is merely representative of one desired possibility for the selective extraction of groundwater, and the relative volumes of extracted groundwater 519A-519D can be adjusted in any desirable manner.

FIG. 6-1 is a schematic illustration of the subsurface well 10 and still another embodiment of the fluid extraction system 612. As illustrated in FIG. 6-1, the fluid extraction system 612 and/or the subsurface well 10 have been altered in a second manner to modify fluid dynamics and thus allow for selective extraction of desired groundwater from within the subsurface well 10. Stated in another manner, FIG. 6-1 illustrates the fluid extraction system 612 in a second enhanced condition that is substantially similar to the first enhanced condition illustrated in FIG. 5-1. As shown, the second enhanced condition again includes moving the location of the pump intake 641 such that the pump intake 641 is at a position much closer to the desired first fluid zone 16A and the second fluid zone 16B. Additionally, the second enhanced condition further includes a change to the diameter of the pump intake 641. More specifically, in this embodiment, the diameter of the pump intake 641 has been increased as a means to further enable the selective extraction of greater volumes of groundwater from the first fluid zone 16A and the second fluid zone 16B. Alternatively, the selective extraction of groundwater can be accomplished through varying the diameter of the pump intake 641 without also moving the location of the pump intake 641.

Additionally, FIG. 6-2 again illustrates a graphical representation of the example of the natural, relative level of contaminants 217A-217D (illustrated with empty rectangular boxes) that can be found within each of the plurality of fluid zones 16A-16D, respectively, within the subsurface well 10.

Further, FIG. 6-2 also illustrates that based on the movement of the location of the pump intake 641 and the change in the diameter of the pump intake 641, the relative volume of groundwater 619A-619D extracted from each of the fluid zones 16A-16D (illustrated with rectangular boxes with angled lines within), respectively, is different than such flows existed when the fluid extraction system 612 and the subsurface well 10 were in the pre-enhanced condition. In particular, in the illustrated second enhanced condition, the greatest volume of groundwater is extracted from the first fluid zone 16A, the next highest volume of groundwater is extracted from the second fluid zone 16B, and a much lower volume of groundwater is extracted from each of the third fluid zone 16C and the fourth fluid zone 16D.

FIG. 7-1 is a schematic illustration of the subsurface well 10 and yet another embodiment of the fluid extraction system 712. As illustrated in FIG. 7-1, the fluid extraction system 712 and/or the subsurface well 10 have been altered in a third manner to modify fluid dynamics and thus allow for selective extraction of desired groundwater from within the subsurface well 10. Stated in another manner, FIG. 7-1 illustrates the fluid extraction system 712 in a third enhanced condition. As shown, the third enhanced condition includes the pump intake 741 having a perforated design that is adapted to provide engineered suction at calculated locations. Additionally, the third optimization condition can further include changing the location and/or diameter of the pump intake 741 as was done in the embodiments illustrated in FIGS. 5-1 and 6-1.

Additionally, FIG. 7-2 again illustrates a graphical representation of the example of the natural, relative level of contaminants 217A-217D (illustrated with empty rectangular boxes) that can be found within each of the plurality of fluid zones 16A-16D, respectively, within the subsurface well 10.

Further, FIG. 7-2 also illustrates that based on the perforation design of the pump intake 741 (as well as the potential change in the location and diameter of the pump intake 741), the relative volume of groundwater 719A-719D extracted from each of the fluid zones 16A-16D (illustrated with rectangular boxes with angled lines within), respectively, is different than such flows existed when the fluid extraction system 712 and the subsurface well 10 were in the pre-enhanced condition. In particular, in the illustrated third enhanced condition, the greatest volume of groundwater is extracted from the first fluid zone 16A, the next highest volume of groundwater is extracted from the second fluid zone 16B, and a much lower volume of groundwater is extracted from each of the third fluid zone 16C and the fourth fluid zone 16D.

FIG. 8-1 is a schematic illustration of the subsurface well 10 and still another embodiment of the fluid extraction system 812. As illustrated, the fluid extraction system 812 and/or the subsurface well 10 have been altered in a fourth manner to modify fluid dynamics and thus allow for selective extraction of desired groundwater from within the subsurface well 10. Stated in another manner, FIG. 8-1 illustrates the fluid extraction system 812 in a fourth enhanced condition. As shown, the fourth enhanced condition includes an inflatable and/or mechanical packer 860 that has been installed between the pump intake 841 and the well screen 26 substantially between the second fluid source 14B and the third fluid source 14C. In this embodiment, by selectively inflating and/or activating the packer 860, with the pump intake 841 positioned below the location of the packer 860 within the subsurface well 10, no groundwater will be extracted from the well 10 from the third fluid source 14C. Stated in another manner, in this fourth enhanced condition, the pump intake 841 will extract no groundwater from the third fluid zone 16C and/or the fourth fluid zone 16D.

Additionally, FIG. 8-2 illustrates a graphical representation of the example of the natural, relative level of contaminants 217A-217B (illustrated with empty rectangular boxes) that can be found within the first fluid zone 16A and the second fluid zone 16B respectively, within the subsurface well 10.

Further, FIG. 8-2 also illustrates that based on the inflation and/or activation of the packer 860, with the pump intake 841 positioned below the location of the packer 860 within the subsurface well 10, the relative volume of groundwater 819A-819B extracted from each of the fluid zones 16A-16D (illustrated with rectangular boxes with angled lines within) is different than such flows existed when the fluid extraction system 812 and the subsurface well 10 were in the pre-enhanced condition. In particular, in the illustrated fourth enhanced condition, the greatest volume of groundwater is extracted from the first fluid zone 16A, a slightly lower volume of groundwater is extracted from the second fluid zone 16B, and no groundwater is extracted from either of the third fluid zone 16C and the fourth fluid zone 16D.

Figures 1, 2, 9:
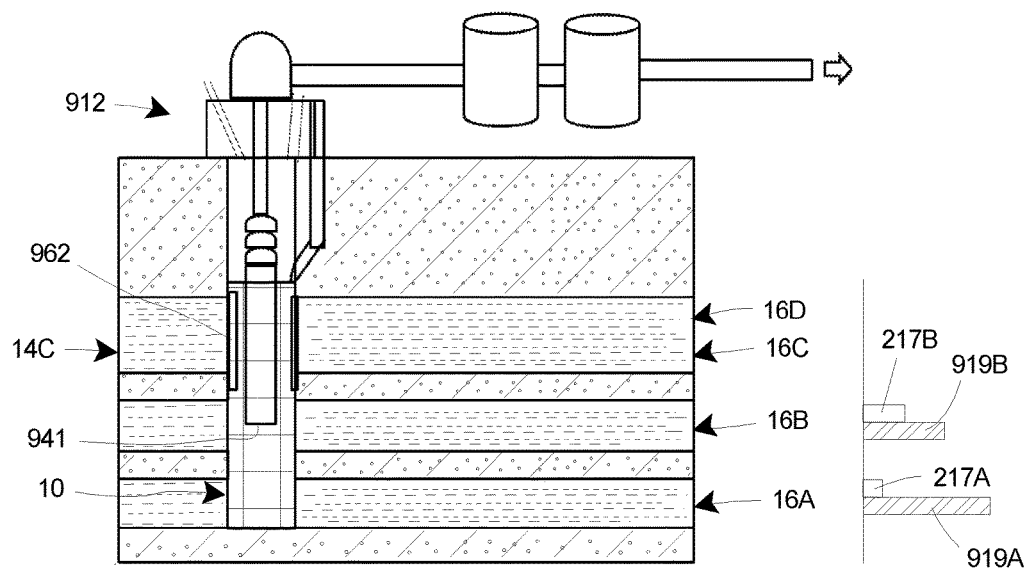

FIG. 9-1 is a schematic illustration of the subsurface well 10 and yet another embodiment of the fluid extraction system 912. As illustrated, the fluid extraction system 912 and/or the subsurface well 10 have been altered in a fifth manner to modify fluid dynamics and thus allow for selective extraction of desired groundwater from within the subsurface well 10. Stated in another manner, FIG. 9-1 illustrates the fluid extraction system 912 in a fifth enhanced condition. As shown, the fifth enhanced condition includes a metal sleeve 962 that has been installed along the well screen 26 substantially adjacent to the third fluid source 14C. In this embodiment, by positioning the metal sleeve 962 along the well screen 26 substantially adjacent to the third fluid source 14C, no groundwater will be extracted from the well 10 from the third fluid source 14C. Stated in another manner, in this fifth enhanced condition, the pump intake 941 will extract no groundwater from the third fluid zone 16C and/or the fourth fluid zone 16D.

Additionally, FIG. 9-2 again illustrates a graphical representation of the example of the natural, relative level of contaminants 217A-217B (illustrated with empty rectangular boxes) that can be found within the first fluid zones 16A and the second fluid zone 16B, respectively, within the subsurface well 10.

Further, FIG. 9-2 also illustrates that based on the inclusion and positioning of the metal sleeve 962, the relative volume of groundwater 919A-919B extracted from each of the fluid zones 16A-16D (illustrated with rectangular boxes with angled lines within) is different than such flows existed when the fluid extraction system 912 and the subsurface well 10 were in the pre-enhanced condition. In particular, in the illustrated fifth enhanced condition, the greatest volume of groundwater is extracted from the first fluid zone 16A, a slightly lower volume of groundwater is extracted from the second fluid zone 16B, and no groundwater is extracted from either of the third fluid zone 16C and the fourth fluid zone 16D.

Figures 1, 2, 10:
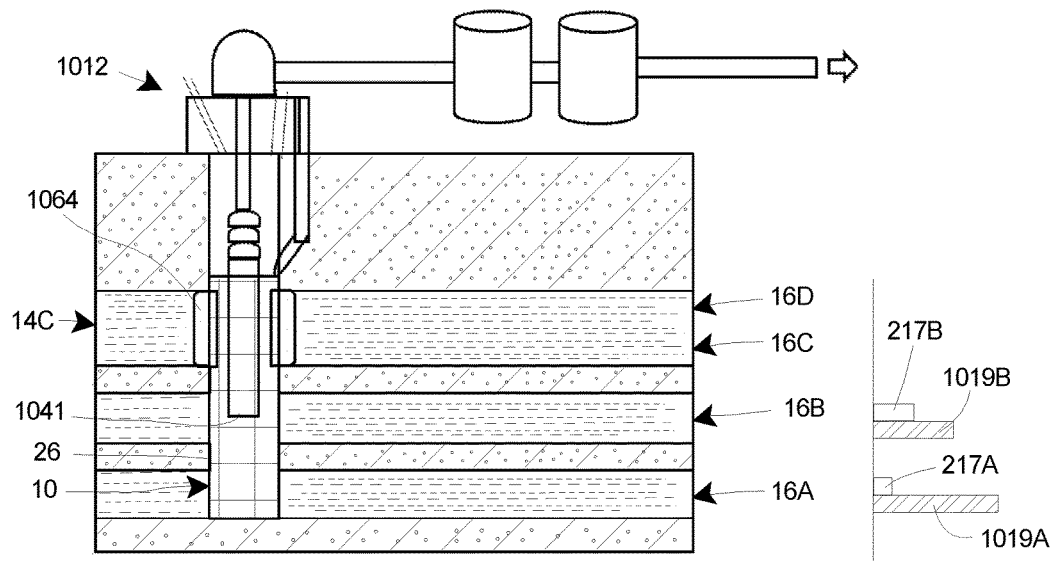

FIG. 10-1 is a schematic illustration of the subsurface well 10 and still yet another embodiment of the fluid extraction system 1012. As shown in FIG. 10-1, the fluid extraction system 1012 and/or the subsurface well 10 have been altered in a sixth manner to modify fluid dynamics and thus allow for selective extraction of desired groundwater from within the subsurface well 10. Stated in another manner, FIG. 10-1 illustrates the fluid extraction system 1012 in a sixth enhanced condition. As shown, the sixth enhanced condition includes a pressure grout concrete sleeve 1064 that has been installed along the well screen 26 substantially adjacent to the third fluid source 14C. In this embodiment, by positioning the concrete sleeve 1064 along the well screen 26 substantially adjacent to the third fluid source 14C, no groundwater will be extracted from the well 10 from the third fluid source 14C. Stated in another manner, in this sixth enhanced condition, the pump intake 1041 will extract no groundwater from the third fluid zone 16C and/or the fourth fluid zone 16D.

Additionally, FIG. 10-2 again illustrates a graphical representation of the example of the natural, relative level of contaminants 217A-217B (illustrated with empty rectangular boxes) that can be found within the first fluid zones 16A and the second fluid zone 16B respectively, within the subsurface well 10.

Further, FIG. 10-2 also illustrates that based on the inclusion and positioning of the concrete sleeve 1064, the relative volume of groundwater 1019A-1019B extracted from each of the fluid zones 16A-16D (illustrated with rectangular boxes with angled lines within) is different than such flows existed when the fluid extraction system 1012 and the subsurface well 10 were in the pre-enhanced condition. In particular, in the illustrated sixth enhanced condition, the greatest volume of groundwater is extracted from the first fluid zone 16A, a slightly lower volume of groundwater is extracted from the second fluid zone 16B, and no groundwater is extracted from either of the third fluid zone 16C and the fourth fluid zone 16D.

Additionally and/or alternatively, in certain applications, in comparison to the pre-enhanced condition, it is desired to extract a lesser relative volume of groundwater from the first fluid zone 16A and the second fluid zone 16B, i.e. the high quality groundwater and the moderate-to-high quality groundwater, and a greater relative volume of groundwater from the third fluid zone 16C and the fourth fluid zone 16D, i.e. the low quality groundwater and the moderate-to-low quality groundwater. For example, in one non-exclusive application, the selective extraction of a greater volume of the lower quality groundwater can be desired for purposes of aquifer restoration.

Figures 1, 2, 11:
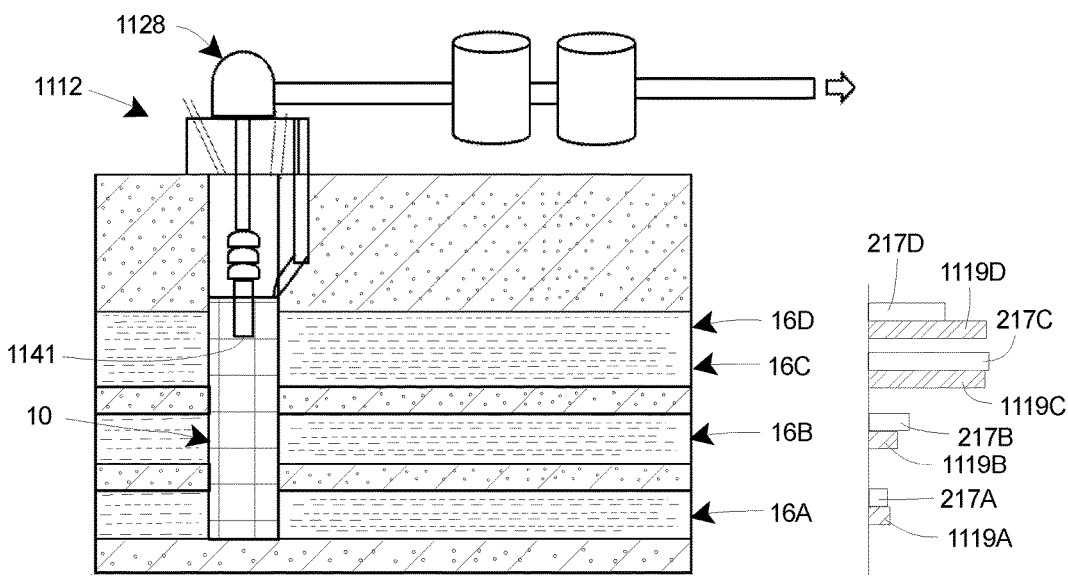

FIG. 11-1 is a schematic illustration of the subsurface well 10 and another embodiment of the fluid extraction system 1112. As illustrated in FIG. 11-1, the fluid extraction system 1112 and/or the subsurface well 10 have been altered in a seventh manner to modify fluid dynamics and thus allow for selective extraction of desired groundwater from within the subsurface well 10. Stated in another manner, FIG. 11-1 illustrates the fluid extraction system 1112 in a seventh enhanced condition. As shown, the seventh enhanced condition includes moving the location of the pump intake 1141 such that the pump intake 1141 is at a position closer to the desired third fluid zone 16C and the fourth fluid zone 16D. Additionally and/or alternatively, the seventh enhanced condition (or a substantially similar enhanced condition) may also be accomplished by changing the pumping rate of the primary pump 1128, as a lower pumping rate (all other factors equal) will tend to extract greater volumes of groundwater that are closer to the fluid intake 1141 than a higher pumping rate.

Additionally, FIG. 11-2 further illustrates a graphical representation of the example of the natural, relative level of contaminants 217A-217D (illustrated with empty rectangular boxes) that can be found within each of the plurality of fluid zones 16A-16D, respectively, within the subsurface well 10.

Further, FIG. 11-2 also illustrates that based on the movement of the location of the pump intake 1141, the relative volume of groundwater 1119A-1119D extracted from each of the fluid zones 16A-16D (illustrated with rectangular boxes with angled lines within), respectively, is different than such flows existed when the fluid extraction system 1112 and the subsurface well 10 were in the pre-enhanced condition. In particular, in the illustrated seventh enhanced condition, the greatest volume of groundwater is extracted from the third fluid zone 16C and the fourth fluid zone 16D, and a much lower volume of groundwater is extracted from each of the first fluid zone 16A and the second fluid zone 16B. It should be understood that the specific relative volumes of groundwater 1119A-1119D that are extracted from each fluid zone 16A-16D is merely representative of one desired possibility for the selected extraction of groundwater, and the relative volumes of extracted groundwater 1119A-1119D can be adjusted in any desirable manner.

Figures 1, 2, 12:
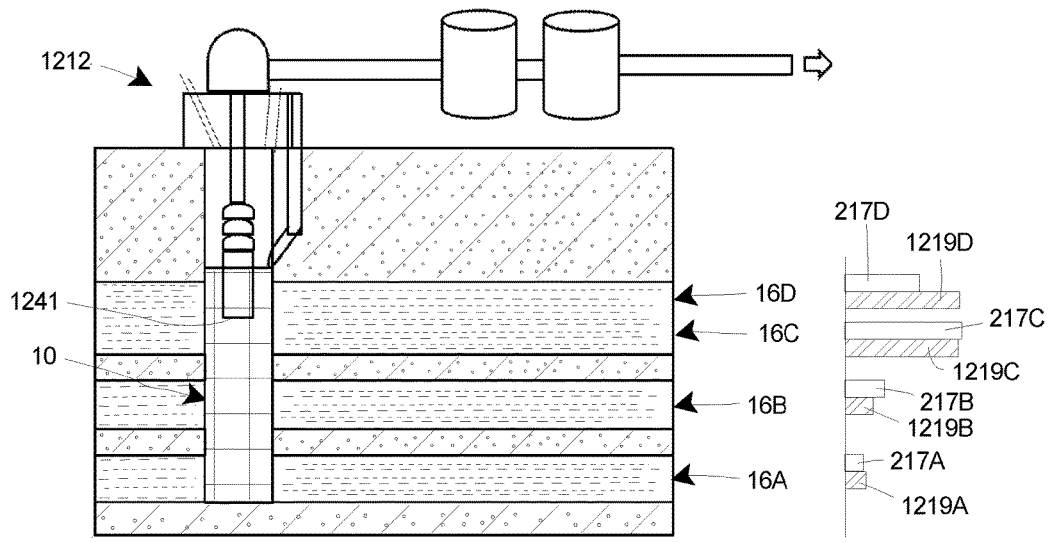

FIG. 12-1 is a schematic illustration of the subsurface well 10 and still another embodiment of the fluid extraction system 1212. As illustrated in FIG. 12-1, the fluid extraction system 1212 and/or the subsurface well 10 have been altered in an eighth manner to modify fluid dynamics and thus allow for selective extraction of desired groundwater from within the subsurface well 10. Stated in another manner, FIG. 12-1 illustrates the fluid extraction system 1212 in an eighth enhanced condition that is substantially similar to the seventh enhanced condition illustrated in FIG. 11-1. As shown, the eighth enhanced condition again includes moving the location of the pump intake 1241 such that the pump intake 1241 is at a position much closer to the desired third fluid zone 16C and the fourth fluid zone 16D. Additionally, the eighth enhanced condition further includes a change to the diameter of the pump intake 1241. More specifically, in this embodiment, the diameter of the pump intake 1241 has been increased as a means to further enable the selective extraction of greater volumes of groundwater from the third fluid zone 16C and the fourth fluid zone 16D. Alternatively, the selective extraction of groundwater can be accomplished through varying the diameter of the pump intake 1241 without also moving the location of the pump intake 1241.

Additionally, FIG. 12-2 again illustrates a graphical representation of the example of the natural, relative level of contaminants 217A-217D (illustrated with empty rectangular boxes) that can be found within each of the plurality of fluid zones 16A-16D, respectively, within the subsurface well 10.

Further, FIG. 12-2 also illustrates that based on the movement of the location of the pump intake 1241 and the change in the diameter of the pump intake 1241, the relative volume of groundwater 1219A-1219D extracted from each of the fluid zones 16A-16D (illustrated with rectangular boxes with angled lines within). respectively, is different than such flows existed when the fluid extraction system 1212 and the subsurface well 10 were in the pre-enhanced condition. In particular, in the illustrated eighth enhanced condition, the greatest volume of groundwater is extracted from the third fluid zone 16C and the fourth fluid zone 16D, and a much lower volume of groundwater is extracted from each of the first fluid zone 16A and the second fluid zone 16B.

Figures 1, 2, 13:
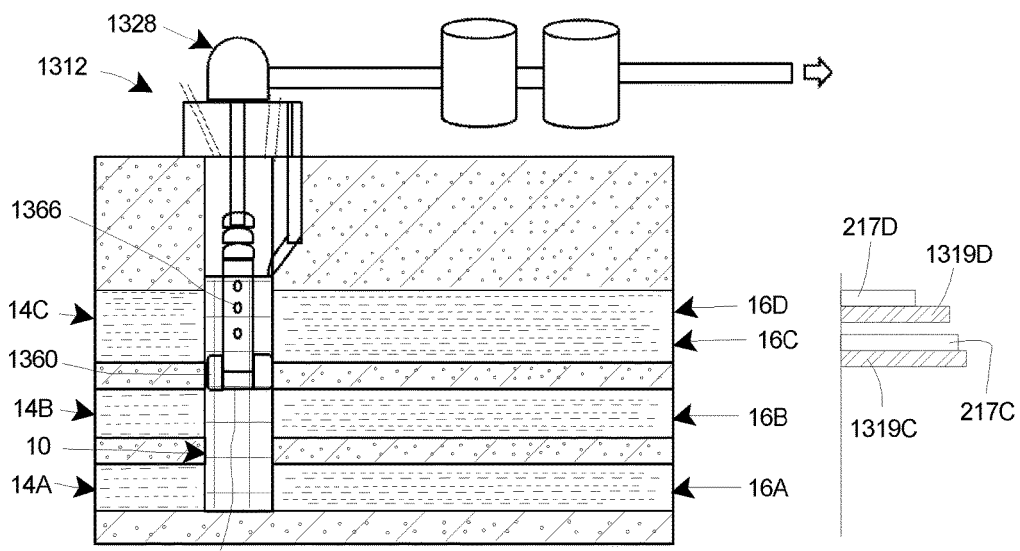

FIG. 13-1 is a schematic illustration of the subsurface well 10 and yet another embodiment of the fluid extraction system 1312. As shown, the fluid extraction system 1312 and/or the subsurface well 10 have been altered in a ninth manner to modify fluid dynamics and thus allow for selective extraction of desired groundwater from within the subsurface well 10. Stated in another manner, FIG. 13-1 illustrates the fluid extraction system 1312 in a ninth enhanced condition. As shown, the ninth enhanced condition includes an inflatable and/or mechanical packer 1360 that has been installed between the pump intake 1341 and the well screen 26 substantially between the second fluid source 14B and the third fluid source 14C. Additionally, the pump intake 1341 can include one or more perforations or apertures 1366 that provide the fluid inlet for the primary pump 1328, and that further enable the selective extraction of groundwater from the third fluid zone 16C and/or the fourth fluid zone 16D. In this embodiment, by selective inflating and/or activating the packer 1360, with the apertures 1366 of the pump intake 1341 positioned above the location of the packer 1360 within the subsurface well 10, no groundwater will be extracted from the well 10 from the first fluid source 14A and/or the second fluid source 14B. Stated in another manner, in this ninth enhanced condition, the pump intake 1341 will extract no groundwater from the first fluid zone 16A and/or the second fluid zone 16B.

Additionally, FIG. 13-2 illustrates a graphical representation of the example of the natural, relative level of contaminants 217C-217D (illustrated with empty rectangular boxes) that can be found within the third fluid zone 16C and the fourth fluid zone 16D, respectively, within the subsurface well 10.

Further, FIG. 13-2 also illustrates that based on the inflation and/or activation of the packer 1360, with the pump intake 1341 positioned effectively above the location of the packer 1360 within the subsurface well 10, the relative volume of groundwater 1319C-1319D extracted from each of the fluid zones 16A-16D (illustrated with rectangular boxes with angled lines within) is different than such flows existed when the fluid extraction system 1312 and the subsurface well 10 were in the pre-enhanced condition. In particular, in the illustrated ninth enhanced condition, the greatest volume of groundwater is extracted from the third fluid zone 16C and the fourth fluid zone 16D, and no groundwater is extracted from either of the first fluid zone 16A and the second fluid zone 16B.

Figures 1, 2, 14:
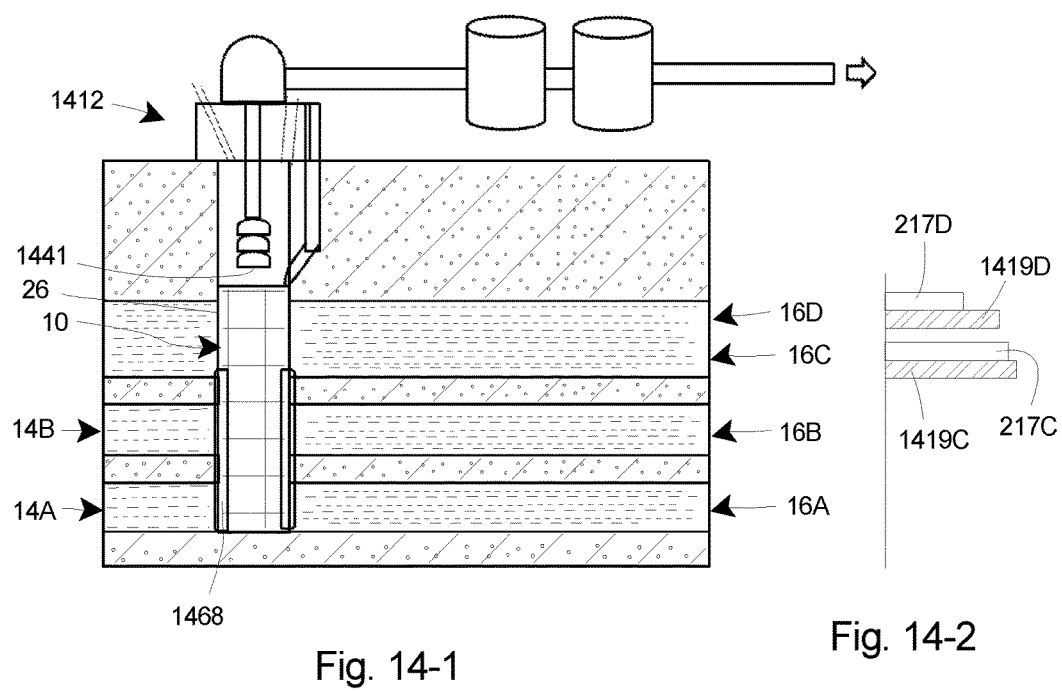

FIG. 14-1 is a schematic illustration of the subsurface well 10 and still yet another embodiment of the fluid extraction system 1412. As illustrated in FIG. 14-1, the fluid extraction system 1412 and/or the subsurface well 10 have been altered in a tenth manner to modify fluid dynamics and thus allow for selective extraction of desired groundwater from within the subsurface well 10. Stated in another manner, FIG. 14-1 illustrates the fluid extraction system 1412 in a tenth enhanced condition. As shown, the tenth enhanced condition includes a sleeve 1468, e.g., a metal sleeve or a concrete sleeve, that has been installed along the well screen 26 substantially adjacent to the first fluid source 14A and the second fluid source 14B. In this embodiment, by positioning the sleeve 1468 along the well screen 26 substantially adjacent to the first fluid source 14A and the second fluid source 14B, no groundwater will be extracted from the well 10 from the first fluid source 14A and the second fluid source 14B. Stated in another manner, in this tenth enhanced condition, the pump intake 1441 will extract no groundwater from the first fluid zone 16A and/or the second fluid zone 16B.

Additionally, FIG. 14-2 again illustrates a graphical representation of the example of the natural, relative level of contaminants 217C-217D (illustrated with empty rectangular boxes) that can be found within the third fluid zone 16C and the fourth fluid zone 16D, respectively, within the subsurface well 10.

Further, FIG. 14-2 also illustrates that based on the inclusion and positioning of the sleeve 1468, the relative volume of groundwater 1419C-1419D extracted from each of the fluid zones 16A-16D (illustrated with rectangular boxes with angled lines within) is different than such flows existed when the fluid extraction system 1412 and the subsurface well 10 were in the pre-enhanced condition. In particular, in the illustrated tenth enhanced condition, the greatest volume of groundwater is extracted from the third fluid zone 16C and the fourth fluid zone 16D, and no groundwater is extracted from either of the first fluid zone 16A and the second fluid zone 16B.

Figure 15:
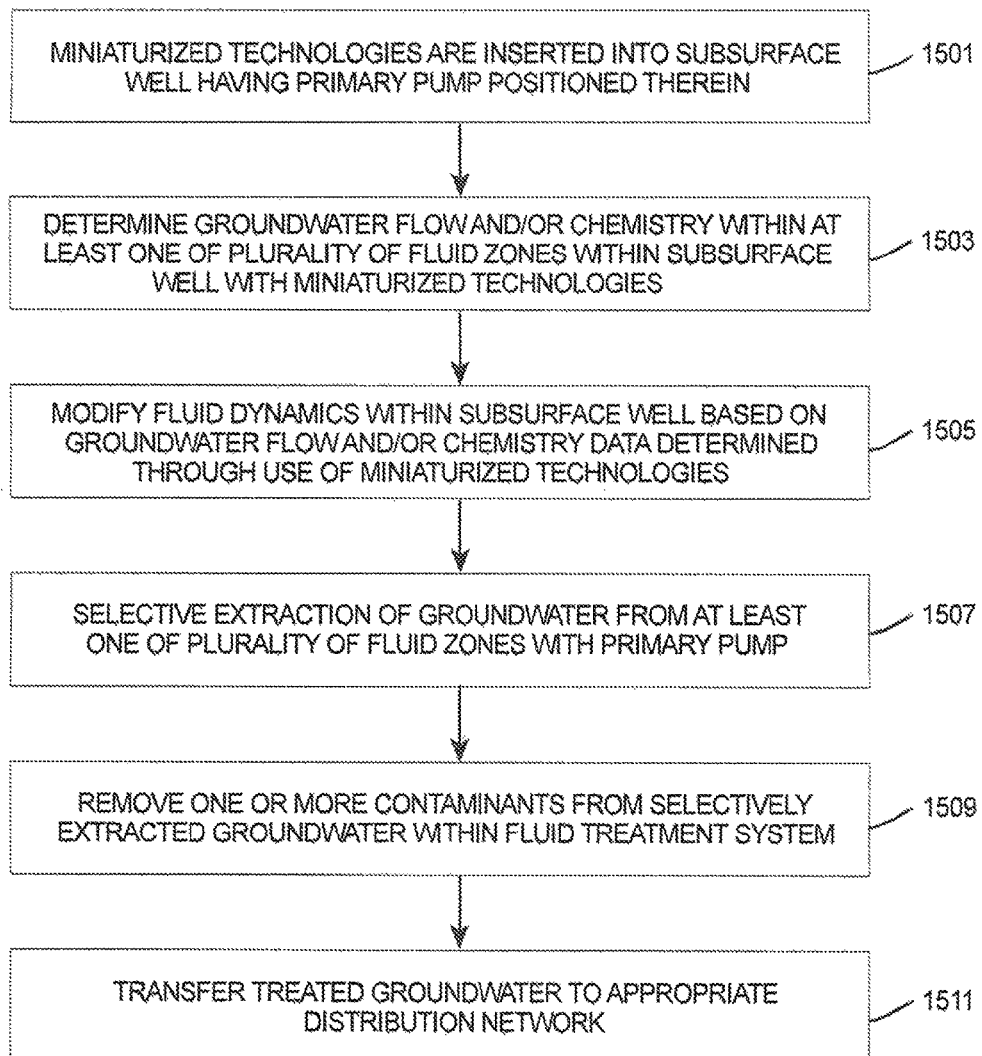
FIG. 15 is a simplified flow chart illustrating one exemplary application of a fluid extraction system having features of the present invention that is usable for reducing the extent of treatment required for desired fluids that are selectively extracted from within a subsurface well.

FIG. 15 is a simplified flow chart illustrating one exemplary application of a fluid extraction system having features of the present invention that is usable for reducing the extent of treatment required for desired fluids, e.g., groundwater, that are selectively extracted from within a subsurface well. As described in detail herein, the fluid extraction system provides various technical and economic advantages to enable the extraction of a larger volume of groundwater from the subsurface well, while requiring a lower overall level of treatment of the groundwater, and thus at a lower overall cost.

It should be noted that the method for reducing the extent of treatment required for groundwater, such as described in this flow chart, can include greater or fewer steps than those specifically identified in FIG. 15, and/or one or more of the steps can be combined or omitted without deviating from the intended scope and breadth of the present invention.

Initially, in step 1501, one or more miniaturized technologies are inserted into the subsurface well having a primary pump positioned at least partially therein. For example, in one specific application, the miniaturized technologies are of small enough size that they can be inserted into the subsurface well through an annulus between the primary pump and the well casing and/or well screen of the subsurface well. Thus, the miniaturized technologies can be inserted into the subsurface well without the need for removing the primary pump.

Next, in step 1503, the miniaturized technologies are utilized within the subsurface well to determine, profile, test, evaluate and/or diagnose groundwater flow and/or groundwater chemistry within at least one of a plurality of fluid zones within the subsurface well. Moreover, the miniaturized technologies can be effectively utilized to determine such desired data within the subsurface well having the primary pump positioned at least partially therein. By allowing the primary pump to be positioned at least partially within the subsurface well during such data collection, the primary pump can actually be used during dynamic testing, which thus enables the collection of much more reliable and accurate data relative to the actual operation of the subsurface well. These miniaturized technologies can acquire the desired data during both dynamic testing, i.e. while the primary pump is turned on, and/or during ambient testing, i.e. while the primary pump is turned off.

Additionally, as provided herein, the miniaturized technologies can include one or more of can include one or more of (i) miniaturized flow profiling technologies (e.g., tracers, lasers, fiber optics, electronics, acoustics and/or any combination thereof); (ii) miniaturized water sampling technologies (e.g., bailers, pumps and/or passive samplers); and (iii) miniaturized sensors (e.g., fiber optic, laser, acoustic and/or electrical sensors). Further, it should be understood that the miniaturized technologies can be moved to and/or positioned at various depth locations within the subsurface well in order to provide appropriate measurements for the determination of groundwater flow and/or groundwater chemistry at different points throughout the subsurface well.

In step 1505, the fluid dynamics are modified within the subsurface well based on the groundwater flow and/or groundwater chemistry data that has been determined through use of the miniaturized technologies. As provided in detail herein, the fluid dynamics within the subsurface well can be modified in various different manners. For example, a non-exclusive listing of different manners in which the fluid dynamics within the subsurface well can be modified include 1) changing the pumping rate, 2) changing the location of the pump intake, 3) changing the diameter of the pump intake nozzle, 4) installing a packer or sleeve below, above or adjacent to an undesirable water quality zone, 5) use of engineered suctions otherwise called fluid velocity controllers, 6) change in the well depth or well diameter, 7) pressure grouting undesirable zones where the undesired water is blocked from entering the well, 8) focused rehabilitation where select zones are unclogged and other zones remain clogged to achieve desirable water quality results and/or 9) the combination of any of such measures.

Once the fluid dynamics have been modified as desired, based on the data acquired through the use of the miniaturized technologies, in step 1507, groundwater from at least one of the plurality of fluid zones is selectively extracted through use of the primary pump. The groundwater can be selectively extracted from within a single fluid zone, or the groundwater can be selectively extracted from within more than one fluid zone. Additionally, when groundwater is selectively extracted from more than one fluid zone, the groundwater has been subjected to controlled in-well blending and, thus, the proportion of groundwater being extracted from each of the fluid zones can be better controlled.

In step 1509, the groundwater that has been selectively extracted from within the subsurface well is treated within a fluid treatment system for the purpose of removing one or more contaminants from the groundwater.

Finally, in step 1511, the treated groundwater can be transferred to an appropriate distribution network.

The present invention is able to provide key economic and technical advantages over previous water removal and/or treatment systems. For example, economic and technical advantages are provided through the use of miniaturized technologies 31 for determining, profiling, testing, evaluating and/or diagnosing the various chemical and flow characteristics within the fluid zones 16A-16D within the subsurface well 10 (i.e. for both dynamic and ambient flows) without removal of the primary pump 28, i.e. with the primary pump 28 positioned at least partially therein.

The in-situ, dynamic test results, derived from the one or more diagnostic miniaturized technologies 31, and with the primary pump 28 inside the well, can be then used to define and structure the goals and components of a well modification that improves, enhances and/or optimizes the water quality discharged from the well head for the purpose of bringing the fluid, e.g., the groundwater, discharged from the well 10 into Department of Health and U.S. EPA compliance standards (<MCLs). These water quality goals essentially apply to all known elements including metals, non-metals, rare earth elements, and all known elemental isotopes as well as all inorganic and organic compounds. Such goals also include zonal identification and segregation of treatment media interferrants that reduce treatment system efficiency, thereby resulting in accelerated bed-loading rates.

Although the described invention, being defined as completely reliant on catheterized well diagnostics with downhole (down-well) miniaturized technologies 31 can be applied to each water quality issue for the purpose of water quality optimization (maximum improvement), for the entire system and subsystems, the same invention can likewise be used for the opposite purpose. The opposite application is where the same approach is then used to concentrate the poor and poorest water quality within the well 10 for the purpose of accelerated treatment, thereby reducing the operational and maintenance costs. Such applications include U.S. EPA Superfund sites, Department of Defense, Department of Energy, Brownfields, State sites and so on, where contaminated groundwater is deliberately pumped from subsurface aquifers for the purpose of aquifer restoration.

In both cases, a feasibility testing protocol can be designed and performed to determine the best approach for suction force alteration through deliberately formulated and designed engineered force-vectors. Through these means, the suction force vectors can be selectively directed to any vertical section of the well 10 and to any set of orifices through either a change in the parameters of the primary pump 28, in the parameters of the well 10 itself, or in any combination of both. In terms of changing the parameters of the primary pump 28, the pumping rate, pump intake depth, shape, size, and suction pipe perforation configurations, at the bottom of the suction pipe and/or along the length of the suction pipe, can be varied as desired. Alteration of the configuration parameters of the well 10 itself can include installation of metal sleeves, inflatable packers and concrete liners and plugs to "block-off" selected orifice sections. Any alteration of the suction field through any combination of pump 28 and well 10 alterations is applicable. The selected alterations can all originate or can be derived from the first step of the process, i.e. the use of catheterized well diagnostics, or miniaturized technologies 31, with the primary pump 28 still in place.

The end result is that pipe flow as defined by the Orifice Equation, the Continuity Equation, the Bernoulli and Darcy-Weisbach equations is deliberately discretized and directed along with the directly associated zonal water chemistry to the well discharge and then corralled into the appropriate treatment and/or blending facility to achieve the desired, enhanced result.

By performing deliberate down-hole blending through the selective extraction processes described herein and combining these improved discharge results with downsized treatment and blending as a single process unit, one or more potential advantages are realized. If the cause is treated first, then the price of treatment, blending, and well rehabilitation drops significantly, e.g., potentially by 50% to 90%. Infrastructure costs can also be reduced dramatically. Additionally, rate payers may see flatter price increases over time, and there may be less treatment, and as a result, less hazardous waste generated from the treatment processes, and/or less electricity consumed. Further, there may be less need for additional pipelines, resulting in less land and habitat disturbance and/or less financial burden placed on rate and tax payers. Moreover, we may also see property values rise, increased crop production at a lower cost, and/or the number of bank loans for property development increase.

While a number of exemplary aspects and embodiments of a fluid extraction system 12 and method have been discussed above, those skilled in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for reducing the extent of treatment required for groundwater, the method comprising the steps of:
   determining at least one of groundwater (1) flow, and (2) chemistry within at least one of a plurality of fluid zones within a subsurface well having a primary pump positioned at least partially therein;
   modifying fluid dynamics within the subsurface well based on at least one of the groundwater flow and chemistry;
   selectively extracting groundwater from at least two of the plurality of fluid zones with the primary pump; and
   controlling the proportion of groundwater being extracted from the at least two fluid zones.

2. The method of claim 1 wherein the step of determining includes the step of utilizing miniaturized technologies to determine one of groundwater (1) flow, and (2) chemistry within at least one of the plurality of fluid zones within the subsurface well.

3. The method of claim 2 wherein the step of determining includes inserting the miniaturized technologies into the subsurface well via an access port that bypasses the primary pump.

4. The method of claim 2 wherein the miniaturized technologies include one or more of miniaturized flow profiling technologies, miniaturized water sampling technologies and miniaturized sensors.

5. The method of claim 1 wherein the step of determining includes the step of determining one of groundwater (1) flow and (2) chemistry within at least one of the plurality of fluid zones within the subsurface well while the primary pump is turned on.

6. The method of claim 1 wherein the step of determining includes the step of determining one of groundwater (1) flow and (2) chemistry within at least one of the plurality of fluid zones within the subsurface well while the primary pump is turned off.

7. The method of claim 1 wherein the step of determining includes applying continuity equations.

8. The method of claim 1 wherein the step of modifying includes the step of blocking groundwater from one or more of the fluid zones from entering the subsurface well.

9. The method of claim 1 wherein the step of modifying includes the step of installing one of a packer and a sleeve substantially adjacent to one or more of the fluid zones to block groundwater from the one or more fluid zones from entering the subsurface well.

10. The method of claim 1 wherein the step of modifying includes the step of pressure grouting one or more of the fluid zones to block groundwater from the one or more fluid zones from entering the subsurface well.

11. The method of claim 1 wherein the step of modifying includes the step of altering one or more features of the primary pump.

12. The method of claim 11 wherein the step of determining includes the primary pump having a pump intake, and wherein the step of altering includes the step of altering one or more of a location, a diameter and a design of the pump intake.

13. A fluid extraction system for reducing the extent of treatment required for groundwater from a subsurface well, the subsurface well being positioned to access a plurality of fluid zones, the fluid extraction system comprising:
   a primary pump; and
   a fluid evaluation system that determines one of groundwater (1) flow, and (2) chemistry within at least one of the plurality of fluid zones within the subsurface well with the primary pump positioned at least partially therein; the primary pump selectively extracting groundwater from at least two of the plurality of fluid zones utilizing fluid dynamics within the subsurface well that have been modified based on at least one of the groundwater flow and chemistry as determined by the fluid evaluation system.

14. The fluid extraction system of claim 13 wherein the fluid evaluation system includes miniaturized technologies for determining one of groundwater (1) flow, and (2) chemistry within at least one of the plurality of fluid zones within the subsurface well.

15. The fluid extraction system of claim 14 further comprising an access port positioned adjacent to the primary pump, the access port providing access for the miniaturized technologies to be inserted into the subsurface well below the primary pump.

16. The fluid extraction system of claim 14 wherein the miniaturized technologies include one or more of miniaturized flow profiling technologies, miniaturized water sampling technologies and miniaturized sensors.

17. The fluid extraction system of claim 13 wherein the fluid evaluation system determines one of groundwater (1) flow, and (2) chemistry within at least one of the plurality of fluid zones within the subsurface well while the primary pump is turned on.

18. The fluid extraction system of claim 13 wherein the fluid evaluation system determines one of groundwater (1) flow, and (2) chemistry within at least one of the plurality of fluid zones within the subsurface well while the primary pump is turned off.

19. The fluid extraction system of claim 13 wherein the fluid evaluation system applies continuity equations for determining one of groundwater (1) flow, and (2) chemistry within at least one of the plurality of fluid zones within the subsurface well.

20. The fluid extraction system of claim 13 wherein the fluid dynamics within the subsurface well have been modified by blocking groundwater from one or more of the fluid zones from entering the subsurface well.

21. The fluid extraction system of claim 13 wherein the fluid dynamics within the subsurface well have been modified by installing one of a packer and a sleeve substantially adjacent to one or more of the fluid zones to block groundwater from the one or more fluid zones from entering the subsurface well.

22. The fluid extraction system of claim 13 wherein the fluid dynamics within the subsurface well have been modified by pressure grouting one or more of the fluid zones to block groundwater from the one or more fluid zones from entering the subsurface well.

23. The fluid extraction system of claim 13 wherein the fluid dynamics within the subsurface well have been modified by altering one or more features of the primary pump.

24. The fluid extraction system of claim 23 wherein the primary pump includes a pump intake, and wherein the fluid dynamics within the subsurface well have been modified by altering one or more of a location, a diameter and a design of the pump intake.

25. A method for reducing the extent of treatment required for groundwater, the method comprising the steps of:
determining with miniaturized technologies each of groundwater (1) flow, and (2) chemistry within each of a plurality of fluid zones within a subsurface well having a primary pump positioned at least partially therein;
modifying fluid dynamics within the subsurface well by at least one of (i) blocking groundwater from one or more of the fluid zones from entering the subsurface well, and (ii) altering one or more features of the primary pump, the modifying being based on at least one of the groundwater flow and chemistry; and
selectively extracting groundwater from at least two of the plurality of fluid zones with the primary pump.

26. The method of claim 25 wherein the step of selectively extracting includes controlling the proportion of groundwater being extracted from the at least two fluid zones.

* * * * *